United States Patent
Koh et al.

(10) Patent No.: US 6,411,743 B1
(45) Date of Patent: Jun. 25, 2002

(54) IMAGE FORMING METHOD AND APPARATUS

(75) Inventors: Shokyo Koh, Mishima; Toshiaki Yagasaki, Hino; Masahiro Funada; Yukari Toda, both of Yokohama, all of (JP)

(73) Assignee: Canon Kabushiki Kaisha, Tokyo (JO)

( * ) Notice: Subject to any disclaimer, the term of this patent is extended or adjusted under 35 U.S.C. 154(b) by 0 days.

(21) Appl. No.: 09/592,547

(22) Filed: Jun. 12, 2000

Related U.S. Application Data

(62) Division of application No. 08/941,048, filed on Sep. 30, 1997, now Pat. No. 6,173,088.

Foreign Application Priority Data

Oct. 1, 1996 (JP) .............................................. 8-260764
Oct. 9, 1996 (JP) .............................................. 8-268497

(51) Int. Cl.⁷ .............................. G06K 9/36; G06K 9/32
(52) U.S. Cl. ....................................... 382/290; 382/296
(58) Field of Search ................................. 358/488, 448, 358/444, 452; 382/289, 290, 170, 293, 296, 297

(56) References Cited

U.S. PATENT DOCUMENTS

| | | | |
|---|---|---|---|
| 5,506,918 A | * 4/1996 | Ishitani | 382/289 |
| 5,625,466 A | 4/1997 | Nakajima | 358/449 |
| 5,930,001 A | 7/1999 | Satoh et al. | 358/296 |
| 6,266,441 B1 | * 7/2001 | Hashimoto et al. | 382/170 |

* cited by examiner

Primary Examiner—Cheukfan Lee
(74) Attorney, Agent, or Firm—Fitzpatrick, Cella, Harper & Scinto

(57) ABSTRACT

An image forming apparatus for inputting an original image and forming an image on a recording medium, includes an image direction detection unit for detecting the image direction of an original image, and a control unit for controlling image forming device to perform predetermined image forming processing in accordance with the detection result of the image direction detection unit. The image direction detection unit outputs a degree of determination as the detection result of the image direction, and a level for determining whether or not the predetermined image processing is done is set for the degree of determination.

29 Claims, 37 Drawing Sheets

FIG. 1A
高
FIG. 1B
打
FIG. 1C
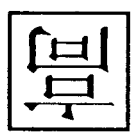
字
FIG. 1D

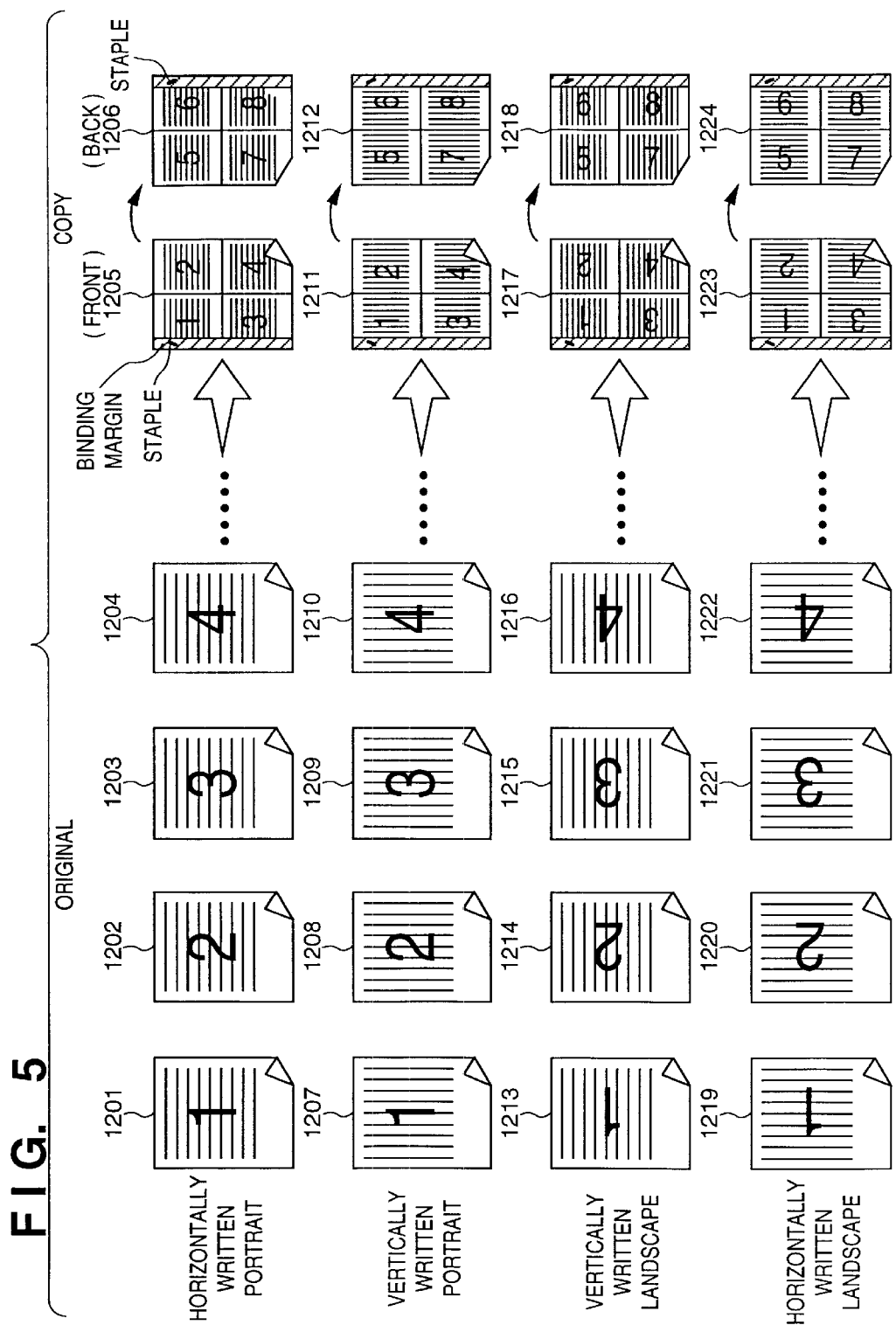

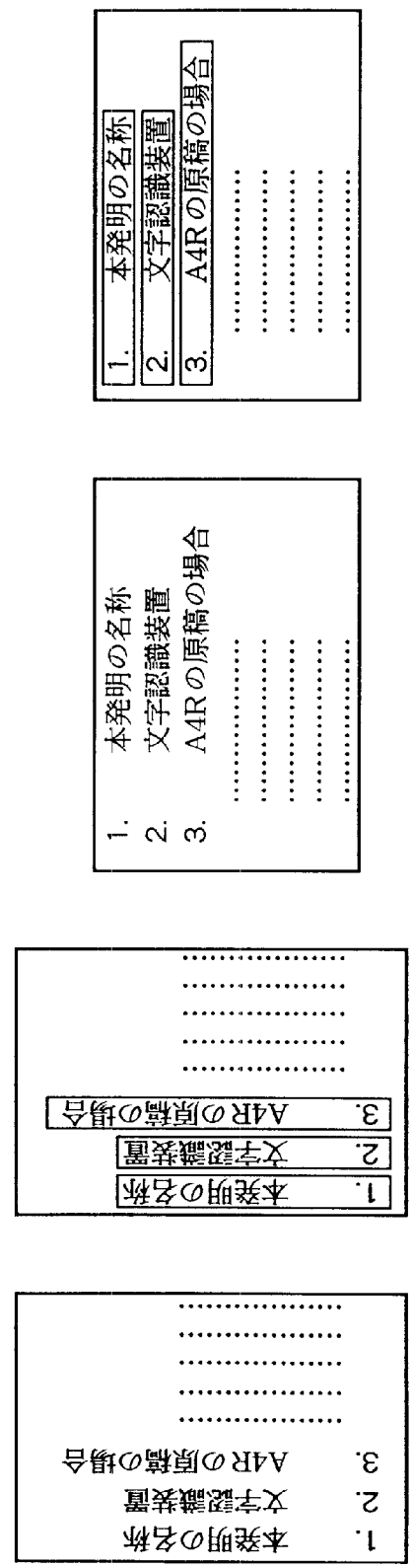

FIG. 13A
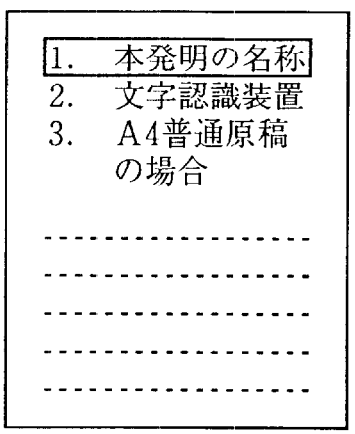
FIG. 13B
本発明の名称
FIG. 13C
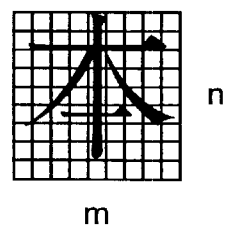
n
m
FIG. 13D
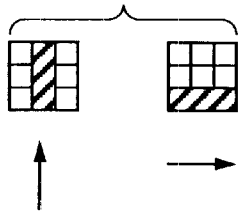

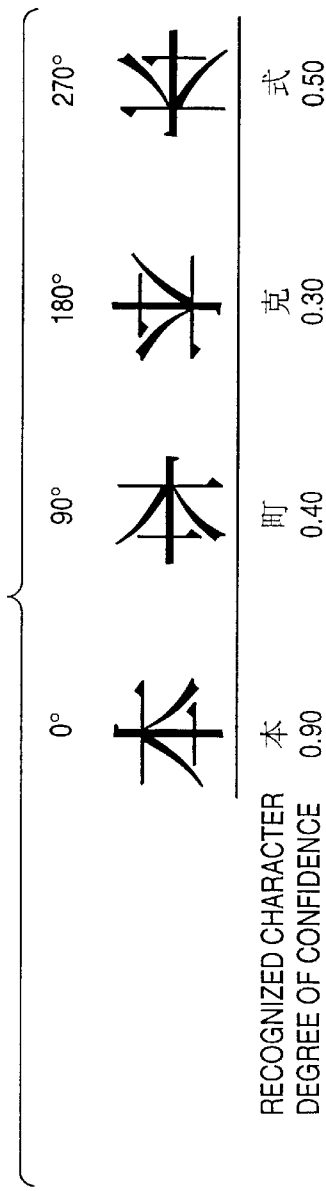

IMAGE FORMING METHOD AND APPARATUS

This application is a divisional application of U.S. patent application Ser. No. 08/941,048, filed Sep. 30, 1997, U.S. Pat. No. 6,173,088.

BACKGROUND OF THE INVENTION

The present invention relates to an image forming method and apparatus, which input an original image and form an image on a recording medium.

A conventional image forming apparatus such as a copying machine forms images on recording sheets in the directions the original images are read. For this reason, when a bundle of originals include both horizontally and vertically written documents or have different image directions, a bundle of output sheets also have different directions. This is beginning to pose a serious problem along with development of a post-process mechanism such as bookbinding.

To solve this problem, a system for recognizing original image directions using a character recognition technique, and adjusting the directions of output images to a given direction has been proposed. The recognition technique of the original image direction uses a technique prevalent in an information processing apparatus. However, the information processing apparatus selects character candidates based on features obtained assuming that a character points in a true direction. For this reason, when image data rotated 90°, 180°, or the like is read, character recognition cannot be normally done, and a quite different character code is often output as a recognition result. For example, in the case of a character "高" shown in FIGS. 1A to 1D, when the character points in the true direction (FIG. 1A), "高" is normally recognized. However, when the character is rotated 270° clockwise (FIG. 1B), "打" is erroneously recognized; when the character is rotated 180° (FIG. 1C), "字" is erroneously recognized; and when the character is rotated 90° (FIG. 1D), recognition is disabled (note that FIGS. 1A to 1D show imaginary character recognition results for descriptive purposes only, which do not always become as indicated in practice).

In order to perform normal character recognition, when the document direction is not true, the direction of an original is manually corrected, and the original is read again to execute character recognition. However, since the processing speed of a scanner has improved, and an automatic document feed function called an auto feeder is often exploited, a large number of originals are likely to be processed at one time, and it is hard to correct original directions manually. On the other hand, there are several types of original document formats such as a vertically written document, horizontally written document, and the like: more specifically, an A4 horizontally written portrait document (see FIG. 2A: popularly used for a Japanese horizontally written document, an English document, and the like), an A4 horizontally written landscape document (see FIG. 2B: popularly used for a document with long sentences, an OHP document, a document obtained by copying A3 or B4 documents in a reduced scale, and the like), an A4 landscape document in which the column directions are switched at the center of the page (see FIG. 2C: popularly used when two A4 documents are continuously copied in a reduced scale), an A4 vertically written portrait document (see FIG. 2D), and the like.

On the other hand, the direction of an image displayed on a monitor is determined by the scanning direction (image reading direction) of a scanner upon inputting an image. For this reason, when an original is read in a direction in which the scanning direction of the scanner agrees with the direction of a character string on a document, the document is displayed in its true direction, as shown in FIG. 3A. However, in the case of an A4 Scanner, since the original direction is uniquely determined, the scanning direction of the scanner does not agree with the direction of a character string on a document, and the character string on the document is displayed while it is rotated 90° from its true direction, as shown in, e.g., FIG. 3B, resulting in an image which is very hard to read.

In order to avoid the above-mentioned recognition errors of a character and an image which is hard to read, an information processing apparatus with an automatic document image direction determination/rotation function has been conventionally proposed. In typical ones of conventional automatic document image direction determination schemes, as shown in FIGS. 4A and 4B, the direction of a portion with lines such as a table is checked based on the region division result, and the direction that divides character regions with a horizontally elongated line (see "a" in FIG. 4A) is determined to be the direction of that document image. Also, histograms in the vertical and horizontal directions of a document are detected, and the direction of the document is determined by checking peaks in the detected histograms (see "b" in FIG. 4B). Furthermore, character regions are extracted from a document, and the direction of the document is determined by checking the features of rectangular regions such as a horizontally or vertically elongated region that matches the feature of a character region (see "c" in FIG. 4B). A document image is rotated based on the document image direction determined by such scheme, and character recognition is done for the rotated image. In particular, such correct character recognition based on the document direction has been increasingly anticipated along with applications of electronic filing for arranging documents in large quantity, development of DTP, and development of equipment such as copying machines that can process documents in large quantity, and techniques that can perform recognition more accurately have been proposed.

However, in the prior art, the information processing apparatus detects the directions of original images using character recognition, and automatically rotates images to adjust the image directions and to control the stapling directions. However, when originals include those having columns or figures, character recognition cannot be accurately done. As a result, original image directions are erroneously detected due to the presence of various types of originals, and copies that the operator did not intend are produced.

The copying machine improves its operation efficiency by attaching accessories such as an automatic document feeder, automatic sorter, and the like. A digital copying machine has been proposed, and sophisticated functions can be realized since an image is processed as digital information. Such functions include, e.g., a so-called reduced-scale layout function.

FIG. 5 shows an example as a combination of a two-sided copying function, binding margin function, and stapling function with this reduced-scale layout function. In FIG. 5, reference numerals 1201, 1202, 1203, 1204, . . . denote a plurality of horizontally written portrait originals. When these originals are set on an automatic document feeder (DF) in the illustrated direction, images on these originals are copied in a layout 1205 on the front side and in a layout 1206 on the back side to have a binding margin, and output copies are stapled at a desired position. Note that "1", "2", "3", "4", ..., "8" in FIG. 5 correspond to the order of originals, i.e., the pages of originals.

However, the above-mentioned prior art suffers the following problem. For example, when vertically written portrait originals 1207, 1208, 1209, 1210, ... are set, images on these originals are copied in a layout 1211 on the front side and in a layout 1212 on the back side, resulting in a very unnatural layout for vertically written documents. Furthermore, the binding margin position and staple position are not suitable for a practical use.

Similarly, when vertically written landscape originals 1213, 1214, 1215, 1216, ... are set, images on these originals are undesirably copied in a layout 1217 on the front side and in a layout 1218 on the back side. Also, when horizontally written landscape originals 1219, 1220, 1221, 1222, ... are set, images on these originals are undesirably copied in a layout 1223 on the front side and in a layout 1224 on the back side. In either case, the layout, binding margin position, staple position, and the like cannot be used in practice.

Furthermore, there are various combinations of the directions (up, down, right, left) in which originals are placed, and the types of originals (horizontal or vertical writing), and an impractical layout, binding margin, and staple position often result.

Even when originals are laid out in advance, if they are laid out again, copies that do not meet the user's requirements are often obtained.

SUMMARY OF THE INVENTION

The present invention has been made to solve the above-mentioned problems, and has as its object to provide an image forming method and apparatus, which can set predetermined image processing in correspondence with the direction detection result of an original image, and can form an image that the operator intended.

The present invention has been made to solve the above-mentioned problems, and has as its object to provide an image forming method and apparatus, which determine the directions and formats of the read original images, and determine the layout of output images in correspondence with the determination results, thus forming images that the user intended.

Other objects of the present invention will become apparent from the following detailed description of the preferred embodiment taken in conjunction with the accompanying drawings.

BRIEF DESCRIPTION OF THE DRAWINGS

FIGS. 1A to 1D show the character directions and recognition results in character recognition processing;

FIGS. 2A to 2D show the formats (various patterns such as vertical writing, horizontal writing, and the like) of original documents;

FIG. 5 shows an example as a combination of a two-sided copying function, binding margin function, and stapling function with a reduced-scale layout function;

FIGS. 12A to 12D show the correspondence between the documents and rectangle information of character regions to be extracted;

FIGS. 13A to 13D are views for explaining character recognition processing in the first embodiment;

FIGS. 14A to 14C are views for explaining character direction determination processing in the first embodiment;

FIG. 32 shows the directions of originals and formats;

DETAILED DESCRIPTION OF THE PREFERRED EMBODIMENTS

The preferred embodiments of the present invention will be described in detail hereinafter with reference to the accompanying drawings.

Figure 6:
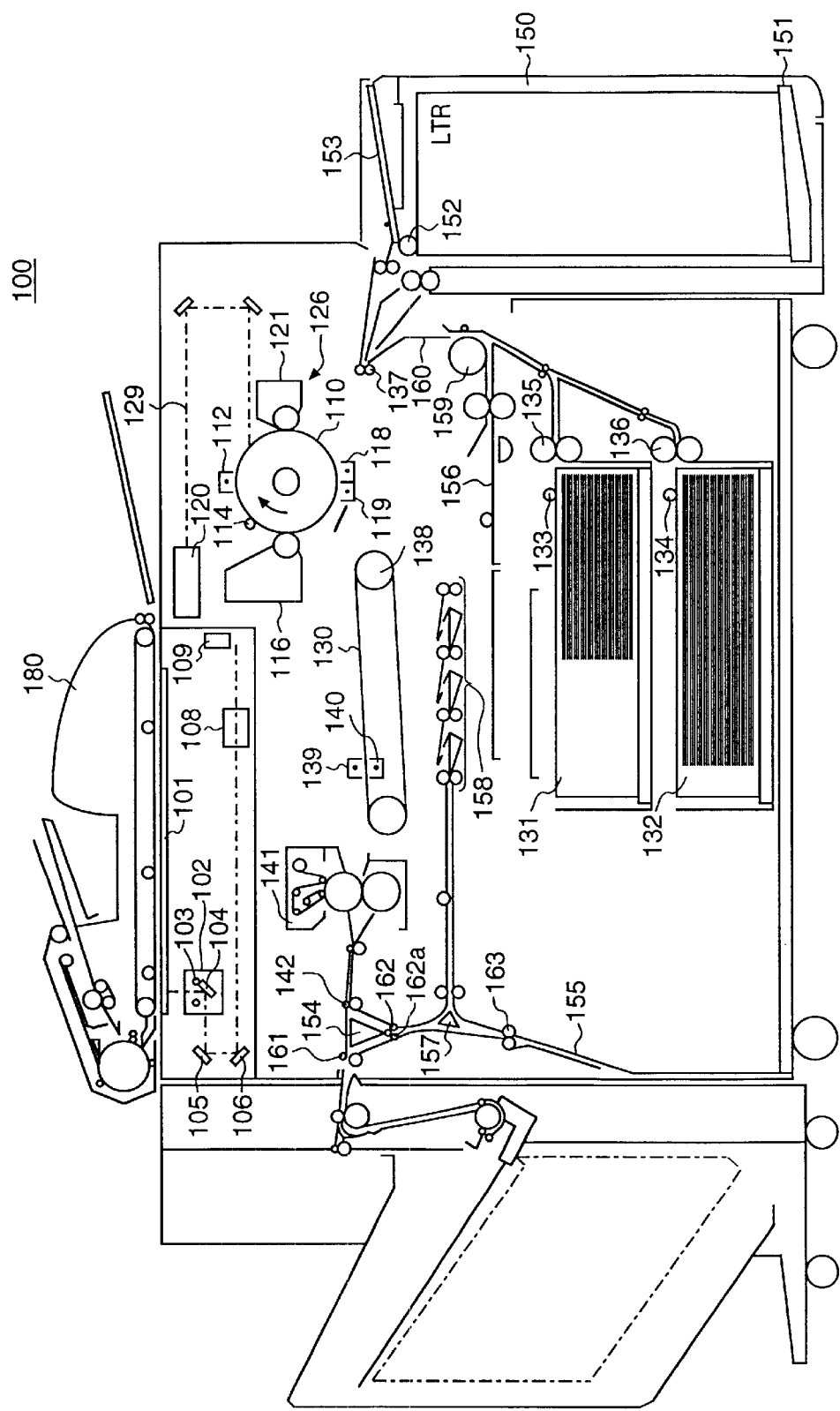
FIG. 6 is a sectional view showing the structure of an image forming apparatus according to the first embodiment of the present invention.

FIG. 6 is a sectional view showing the structure of an image forming apparatus according to the embodiment of the present invention. Referring to FIG. 6, reference numeral 100 denotes a copying apparatus main body; and 180, a repeating automatic document feeder (RDF). Reference numeral 101 denotes a platen glass serving as an original placing table; and 102, a scanner, which is constituted by an original illumination lamp 103, a scanning mirror 104, and the like. The scanner 102 is reciprocally scanned by a motor (not shown) in predetermined directions, and light reflected by an original is transmitted through a lens 108 via scanning mirrors 104 to 106, thus forming an image on a CCD sensor 109. Reference numeral 120 denotes an exposure control unit comprising, e.g., a laser, polygonal scanner, and the like. The exposure control unit 120 irradiates, onto a photosensitive drum 110, a laser beam 129, modulated on the basis of an image signal which is converted into an electrical signal by the CCD sensor (image sensor unit) 109 and is subjected to predetermined image processing (to be described later). A primary charger 112, a developer 121, a transfer charger 118, a cleaning device 116, and a pre-exposure lamp 114 are arranged around the photosensitive drum 110. In an image forming unit 126, the photosensitive drum 110 is rotated in the direction indicated by an arrow in FIG. 6, and is charged to a desired potential by the primary charger 112. Thereafter, the laser beam 129 from the exposure control unit 120 is irradiated on the photosensitive drum 110, thus forming an electrostatic latent image thereon. The electrostatic latent image formed on the photosensitive drum 110 is developed by the developer 121 so as to be visualized as a toner image.

A transfer sheet fed from an upper or lower cassette 131 or 132 by a pickup roller 133 or 134 is fed into the main body by feed rollers 135 or 136, and is fed onto a transfer belt 130 by registration rollers 137. Thereafter, the visualized toner image is transferred onto the transfer sheet by the transfer charger 118. After the transfer, the residual toner on the photosensitive drum 110 is cleaned by the cleaning device 116, and the residual charge is erased by the pre-exposure lamp 114. After the transfer, the transfer sheet is peeled from the transfer belt 130, and the toner image thereon is re-charged by pre-fixing chargers 139 and 140. The transfer sheet is then fed to a fixing device 141 and the toner image is fixed by pressure and heat. Finally, the transfer sheet is exhausted outside the main body 100 by exhaust rollers 142.

Reference numeral 119 denotes an attraction charger for attracting the transfer sheet fed from the registration rollers 137 to the transfer belt 130; and 138, a transfer belt roller which is used for rotating the transfer belt 130, and attracting and charging the transfer sheet to the transfer belt 130 in combination with the attraction charger 119. The main body 100 is equipped with a deck 150 that can stock, e.g., 4,000 transfer sheets. A lifter 151 of the deck 150 moves upward in correspondence with the quantity of transfer sheets so that the uppermost transfer sheet always contacts a feed roller 152. Also, a multi manual insertion port 153 that can stock 100 transfer sheets is also equipped.

Furthermore, reference numeral 154 denotes an exhaust flapper, which switches the route between the two-side recording or multiple recording side, and the exhaust side. The transfer sheet fed from the exhaust rollers 142 is switched to the two-side recording or multiple recording side. Also, reference numeral 158 denotes a lower convey path, which reverses the transfer sheet fed from the exhaust rollers 142 via a reversing path 155, and guides it toward a re-feed tray 156. Reference numeral 157 denotes a multiple flapper for switching the route between the two-sided recording and multiple recording. When the multiple flapper 157 is turned to the left, the transfer sheet is directly guided to the lower convey path 158 without going through the reversing path 155. Reference numeral 159 denotes a feed roller for feeding the transfer sheet toward the image forming unit 126 side via a route 160.

Reference numeral 161 denotes an exhaust roller which is arranged in the vicinity of the exhaust flapper 154, and exhausts, outside the apparatus, the transfer sheet whose route has been switched to the exhaust side by the exhaust flapper 154. In the two-sided recording (two-sided copying) or multiple recording (multiple copying) mode, the exhaust flapper 154 is moved upward, and the copied transfer sheet is stored in the re-feed tray 156 via the convey paths 155 and 158. At this time, the multiple flapper 157 is turned to the right in the two-sided recording mode, and is turned to the left in the multiple recording mode. The transfer sheets stored in the re-feed tray 156 are picked up one by one from the lowermost one by the feed roller 159, and the picked-up sheet is guided toward the registration rollers 137 of the main body via the route 160.

When the reversed transfer sheet is exhausted from the main body, the exhaust flapper 154 is pushed upward, and the flapper 154 is turned to the right to convey the copied transfer sheet toward the convey path 155. After the trailing end of the transfer sheet has passed a first feed roller 162, the transfer sheet is conveyed by reversing rollers 163 toward a second feed roller, and is reversed and exhausted outside the apparatus by exhaust rollers 161.

Figure 7:
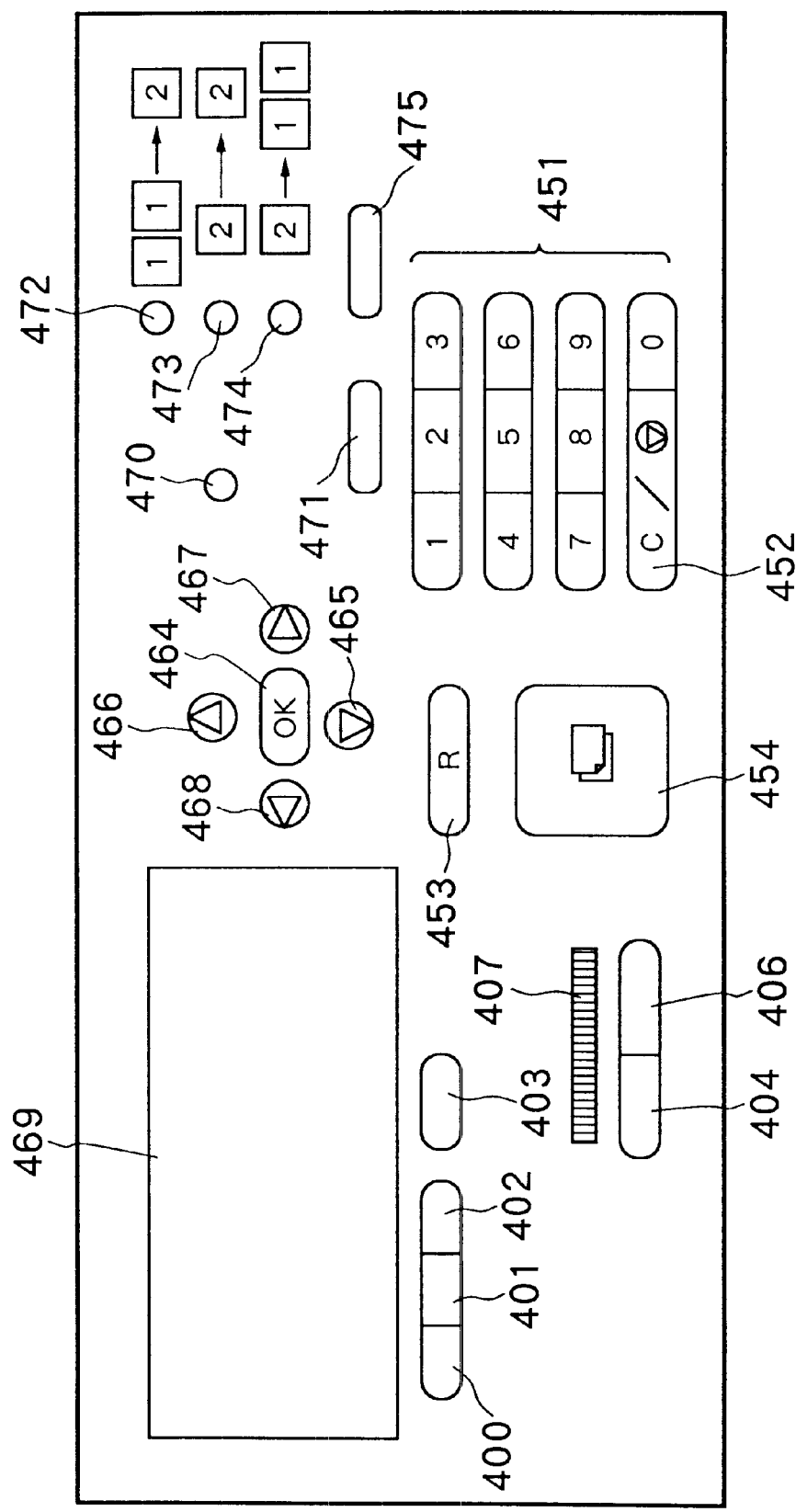
FIG. 7 is a plan view showing the arrangement of a console in the first embodiment.

FIG. 7 shows the arrangement of a console in this embodiment. Referring to FIG. 7, reference numeral 451 denotes a ten-key pad, which is used for setting the copy count or mode or inputting a numerical value upon image formation. Reference numeral 452 denotes a clear/stop key, which is used for clearing the set image formation count or stopping image formation. Reference numeral 453 denotes a reset key for resetting the set image formation count or operation mode to default values. Reference numeral 454 denotes a start key. Upon depression of this key 454, image formation is started. Reference numeral 469 denotes a display panel comprising, e.g., a liquid crystal display, the display contents of which change in correspondence with the set mode so as to facilitate detailed mode setting. In this embodiment, a cursor on the display panel 469 is moved using one of cursor keys 465 to 468, and the set contents are determined using an OK key 464. Note that the setting method is not limited to such specific method. For example, the display panel 469 may comprise a touch panel to perform setting.

Reference numeral 471 denotes a paper type setting key, which is set when image formation is done on a recording medium thicker than a standard one. When a thick paper mode is set by the paper type setting key 471, an LED 470 is controlled to be turned on. In this embodiment, the thick paper mode alone can be set. Also, functions may be extended to allow setting of modes for other special sheets such as an OHP sheet, and the like, as needed. Reference numeral 475 denotes a two-sided copying mode setting key. For example, with this key, four different two-sided copying modes, i.e., a "one-to-one mode" for forming one-sided outputs from one-sided originals, a "one-to-two mode" for forming two-sided outputs from one-sided originals, "two-to-two mode" for forming two-sided outputs from one-sided originals, and "two-to-one mode" for forming two one-sided outputs from a two-sided original, can be set. LEDs 472 to 474. are selectively turned on in correspondence with the selected two-sided copying mode. For example, all the LEDs 472 to 474 are controlled to be turned on in the "one-to-one mode"; the LED 472 alone in the "one-to-two mode"; the LED 473 alone in the "two-to-two mode"; and the LED 474 alone in the "two-to-one mode".

Figure 8:
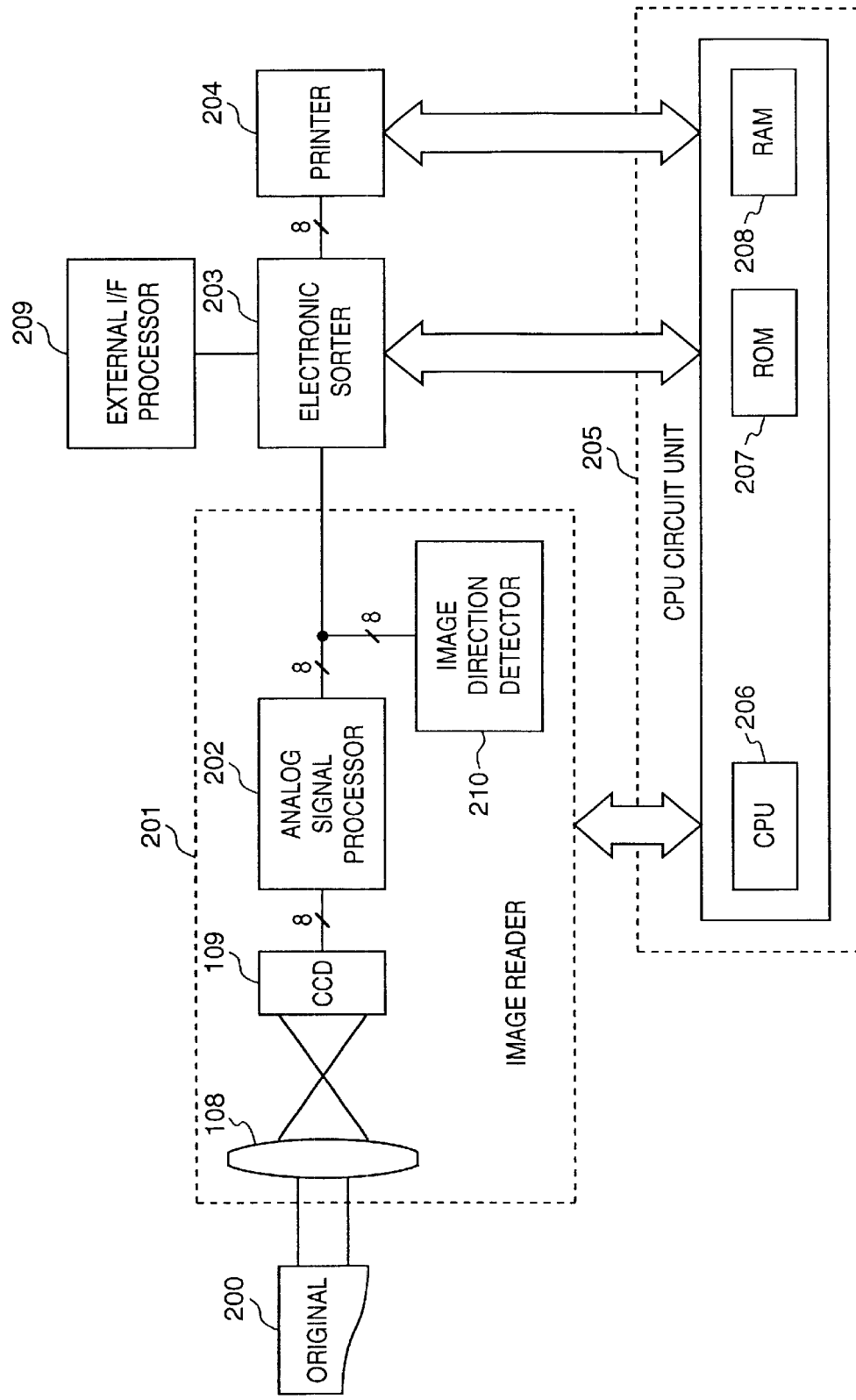
FIG. 8 is a block diagram showing the control system of the image forming apparatus of the first embodiment.

FIG. 8 is a block diagram showing the control system of the image forming apparatus of this embodiment. Referring to FIG. 8, reference numeral 201 denotes an image reader, which is constituted by the CCD sensor 109, an analog signal processor 202, and the like. In the image reader 201, an original image formed on the CCD image sensor 109 via the lens 108 is converted into an analog electrical signal by the CCD sensor 109. The converted image information is input to the analog signal processor 202, and is subjected to sampling & holding, correction of dark level, and the like. Thereafter, the image information is analog-to-digital (A/D) converted. The digital signal is subjected to shading correction (for correcting variations of the sensor for reading an original image, and the light distribution characteristics of the original illumination lamp) and variable-magnification processing. Thereafter, the processed signal is input to an electronic sorter 203 and an image direction detector 210. The image direction detector 210 will be described in detail later.

Reference numeral 209 denotes an external interface (I/F) processor, which develops image information input from an external computer, and inputs it as image data to the electronic sorter 203. The electronic sorter 203 performs correction processing such as gamma (γ) correction and the like required in an output system, and other processing such as smoothing processing, edge emphasis, and the like, and outputs the processed data to a printer 204. The printer 204 comprises the exposure control unit 120 constituted by the laser, and the like, the image forming unit 126, the transfer sheet convey control unit, and the like, which have already been described above with the aid of the sectional view of FIG. 6, and records an image on a transfer sheet on the basis of the input image signal. A CPU circuit unit 205 comprises a CPU 206, a ROM 207, a RAM 208, and the like, and systematically controls the sequence of the apparatus of this embodiment by controlling the image reader 201, electronic sorter 203, printer 204, and the like.

Figure 9:
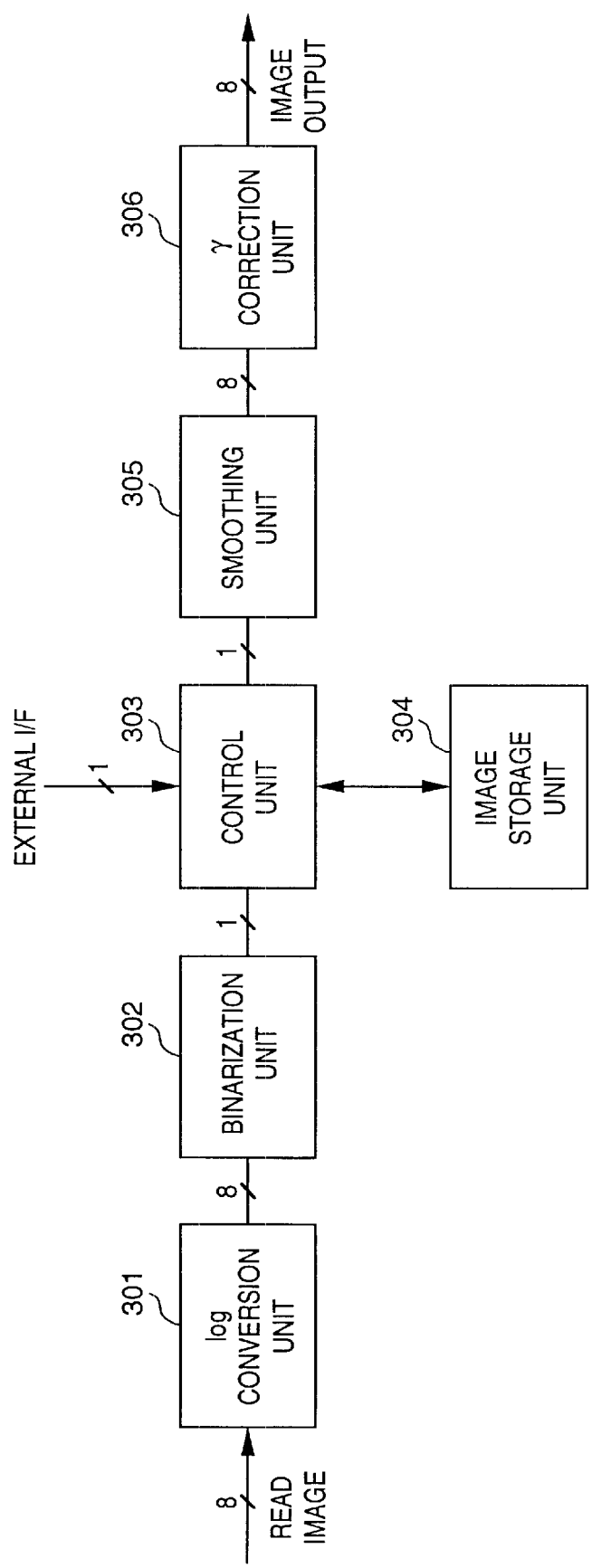
FIG. 9 is a block diagram showing the arrangement of an electronic sorter 203 in detail.

FIG. 9 is a block diagram showing the arrangement of the electronic sorter 203 in detail. An image sent from the image reader 201 is input as black luminance data, which is supplied to a logarithm (log) converter 301. The log converter 301 stores an LUT for converting input luminance data into density data, and converts luminance data into density data by outputting a table value corresponding to the input data. Thereafter, the density data is supplied to a binarization unit 302. The binarization unit 302 binarizes the multi-valued density data into binary data to set a density value "0" or of "255". Input 8-bit image data is converted into 1-bit binary image data "0" or "1", thus reducing the image data volume to be stored in a memory.

However, when an image is binarized, the number of gray levels of the image is decreased from 256 to 2. When image data such as a picture image having many halftone levels is binarized, the image deteriorates considerably. In order to prevent such deterioration, pseudo halftone expression must be done using binary data.

In this embodiment, error diffusion is used as a method for achieving pseudo halftone expression using binary data. In this method, when the density of a certain image is larger than a given threshold value, the image is determined to be density data "255"; when the density is equal to or smaller than the given threshold value, the image is determined to be density data "0", After the image is converted into binary data, the difference between the actual density data and binary data is diffused to the surrounding pixels as an error signal. Note that error diffusion is implemented by multiplying an error produced by binarization with a weighting coefficient on a matrix prepared in advance, and adding the product to the surrounding pixels. With this processing, the average density value of the entire image can be preserved, and pseudo halftone levels can be expressed using binary data.

The binary image data is supplied to a control unit 303. On the other hand, since image data input from an external computer via the external I/F processor 209 is converted into binary image data by the external I/F processor 209, it is directly supplied to the control unit 303. The control unit 303 temporarily stores the entire original image to be copied in an image storage unit 304 and sequentially reads out image data from the image storage unit 304 to output it, in accordance with instructions from the main body. The image storage unit 304 has a SCSI controller and a hard disk (memory; neither are shown), and writes image data in the hard disk in accordance with an instruction from the SCSI controller. A plurality of image data stored in the hard disk are output in an order corresponding to an edit mode designated at the console of the copying machine. For example, in a sort mode, a bundle of originals are read from the DF in the order from the last page to the first page, and are temporarily stored in the hard disk. The temporarily stored image data of the originals are read out from the hard disk in the order from the last page to the first page, and are output by repeating the operation a plurality of number of times. In this manner, the same function as that of a sorter having a plurality of bins can be realized.

Image data read out from the image storage unit 304 is supplied to a smoothing unit 305. The smoothing unit 305 converts 1-bit data into 8-bit data so that the image data signal has "0" or "255". The converted image data is replaced by a weighted average value obtained as a sum total of the products of the coefficients on a predetermined matrix and the density values of neighboring pixels. With this processing, binary data is converted into multi-valued data in correspondence with the density values of neighboring pixels, and image quality close to that of the read image can be reproduced. The smoothed image data is input to a γ correction unit 306. The γ correction unit 306 performs conversion using an LUT in consideration of the characteristics of the printer to adjust the output in correspondence with the density value set at the console upon outputting the density data.

Figure 10:
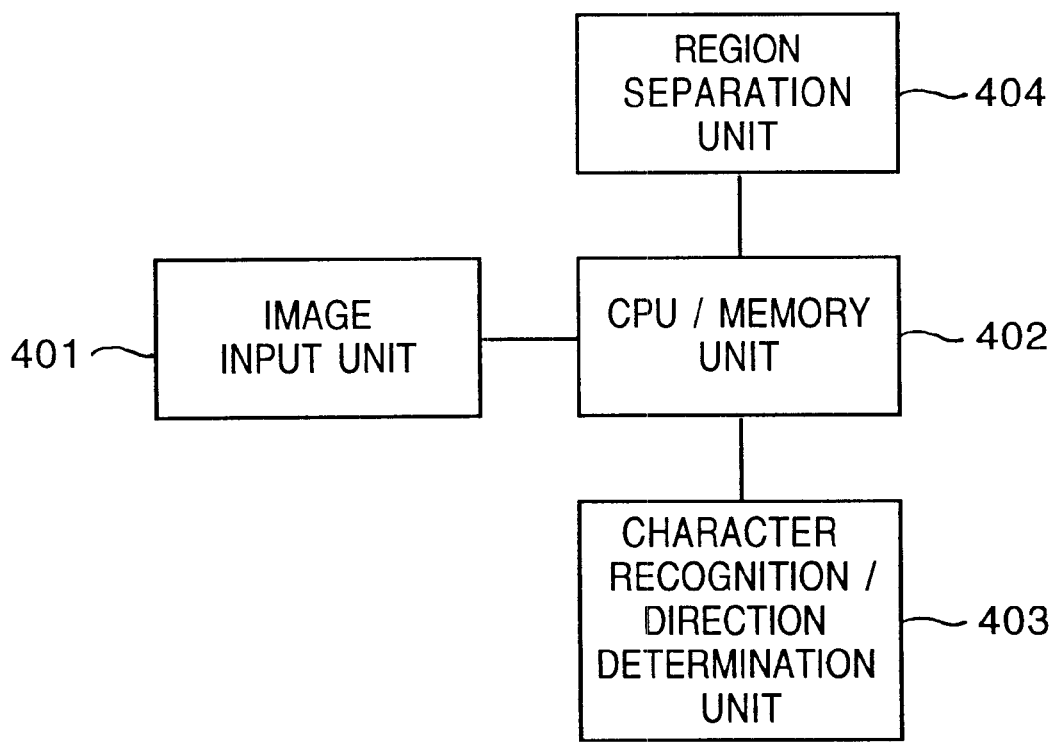
FIG. 10 is a block diagram showing the arrangement of an image direction detector 210 in the first embodiment.
Figure 11:
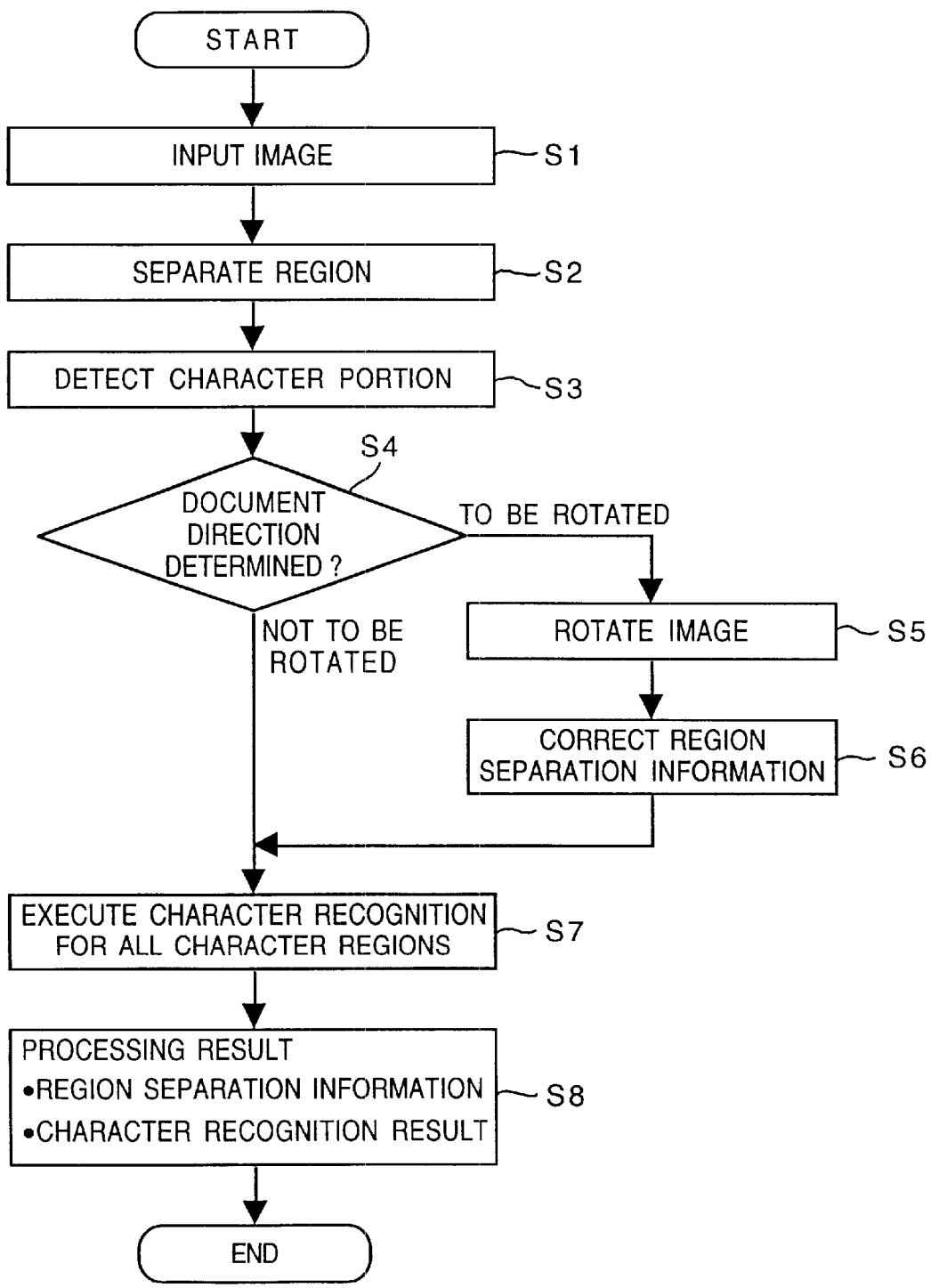
FIG. 11 is a flow chart showing the image direction detection processing in the first embodiment.

The detection method of the image direction detector 210 will be described below with reference to FIGS. 10 to 12. FIG. 10 is a block diagram showing the arrangement of the image direction detector 210 in this embodiment. In FIG. 10, reference numeral 401 denotes an image input unit, which inputs image data which has been subjected to variable-magnification processing in the analog signal processor 202 in FIG. 8. Reference numeral 402 denotes a CPU/memory unit, which performs image direction detection, and comprises a memory for converting image data to resolution required for determining the image direction, and temporarily storing the converted image data. Reference numeral 403 denotes a character recognition/direction determination unit, which performs character recognition of several different character regions in a document from directions 0°, 90°, 180°, and 270° and determines a direction with the highest precision (the degree of confidence of character recognition: the distance to the feature distribution of a character) among those of the character recognition results from the individual directions to be the document direction, while paying attention to the fact that a character best expresses the document direction. Reference numeral 404 denotes a region separation unit, which separates a character portion, figure portion, natural image portion, table portions, and the like in document image data into rectangular regions and adds attributes (character portion and the like) of the individual regions, as pre-processing for character recognition and direction determination by the character recognition/direction determination unit 403.

The outline of the document direction automatic determination, correction, and character recognition will be described below. FIG. 11 is a flow chart showing the image direction detection processing in this embodiment. Image data (multi-valued image) input by the image input unit 401 is separated by the region separation unit 404 into rectangular regions in units of attributes such as a character portion, figure portion, natural image portion, table portion, and the like (steps S1 and S2). In practice, the unit 404 generates region information surrounded by a rectangle. Subsequently, the rectangle information of each character region is extracted from the attributes (step S3). Note that the character region includes a text portion, title portion, characters in a table, caption portion of a figure, and the like. For example, in the case of documents shown in FIGS. 12A and 12C, character regions shown in FIGS. 12B and 12D are respectively extracted as rectangle information. Using several blocks among these regions, the document direction is determined (step S4). As a result, if the document direction agrees with the true direction, character recognition is done for character blocks in the image (step S7).

On the other hand, if the document direction does not agree with the true direction, image data is rotated to point in the true direction (step S5). The rotated image is separated into regions, and region separation information is corrected (step S6). In this processing, the phase of the region separation information upon rotation of the image is corrected. As the correction method, a method of performing region separation processing again for all the rotated image data, and a method of address-converting the region separation results are available. Since the region separation processing assumes that the image has a true direction, the results of initial region separation processing may often be different from those of the region separation processing performed for the rotated image data. For this reason, the former method is preferably adopted. A character region block in the rotated image data is recognized by a character recognition processing system (step S7). Finally, region separation information and character recognition information are obtained (step S8) in both directions that may or may not require rotation. The processing results are supplied to the CPU circuit unit 205 shown in FIG. 8. The CPU circuit unit 205 rotates an image using the character recognition result, and controls, e.g., the staple position of an exhaust processing unit.

Figure 3B:
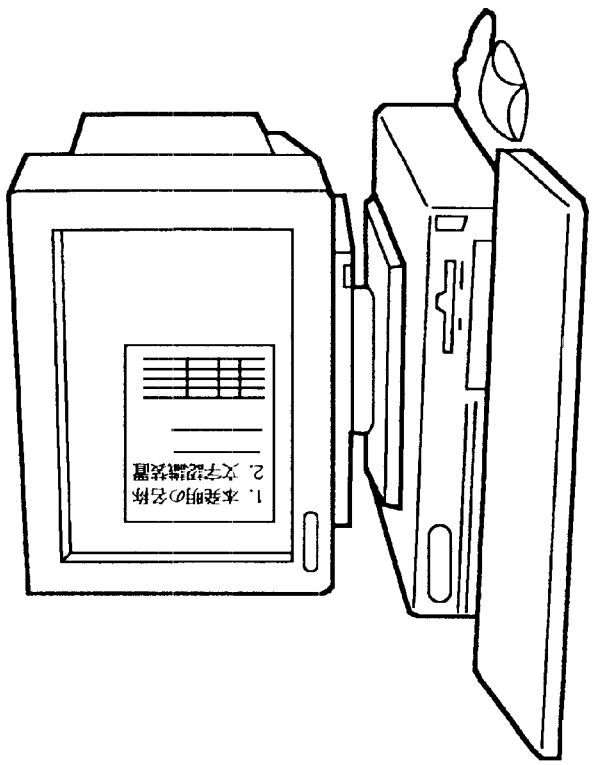
FIGS. 3A and 3B show the directions of images displayed on a monitor.
Figure 3A:
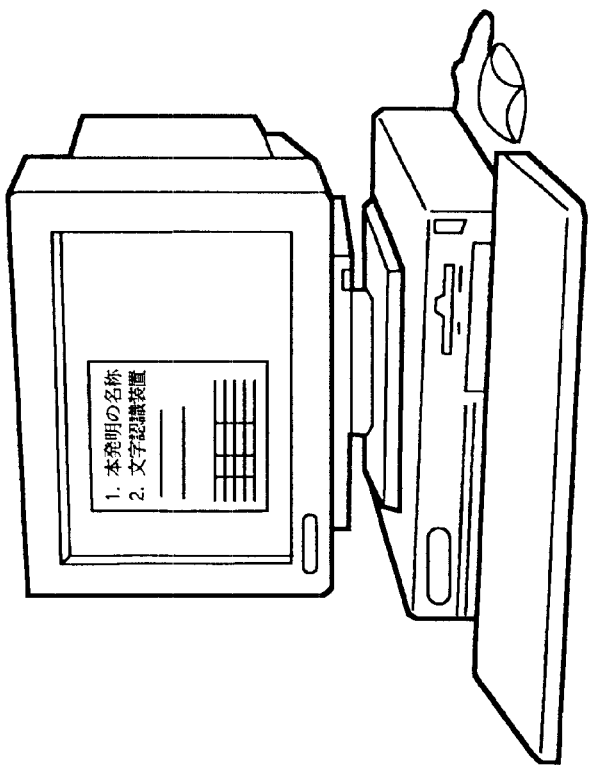
Figure 4B:
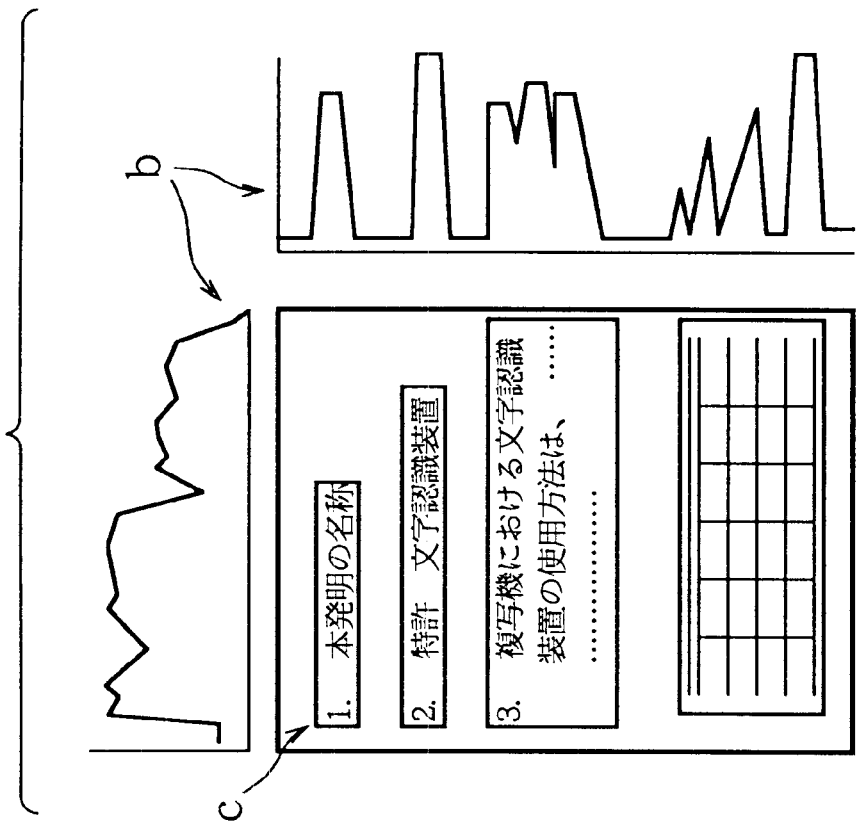
FIGS. 4A and 4B are views for explaining the automatic determination schemes of the document image direction.
Figure 4A:
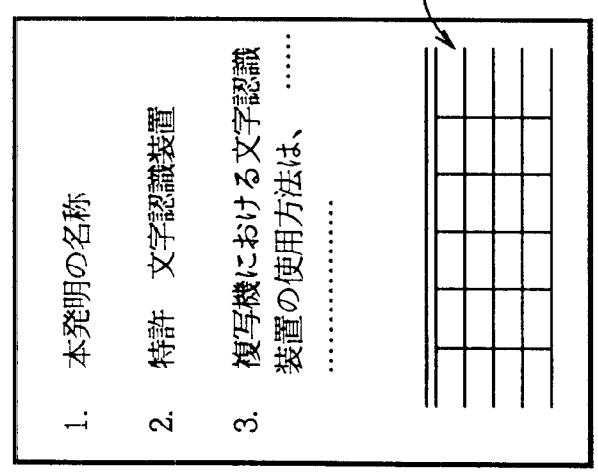

A document direction determination scheme using character recognition will be explained below. In the region separation processing, black pixels in document image data are detected to form a rectangular frame of a black pixel block by contour tracking or labeling. A character region (title, main text, caption, or the like), figure region, natural image region, table region, or the like is determined with reference to the presence/absence of neighboring rectangular blocks, the aspect ratio of the rectangle, and the like. As the character recognition, a feature vector extraction method, a comparison method, and the like are available. For example, as shown in FIG. 13A, when a character region including a character "本" is determined, characters are extracted from this character region (see FIG. 3B) in the first process. This processing extracts a rectangle corresponding to one character, and can be implemented by detecting the continuity of black pixels. In the second process, each character is extracted into an m×n (e.g., 64×64) pixel block (see FIG. 13C). Using a 3×3 pixel window, the distribution directions of black pixels are extracted (direction vector information: see FIG. 13D).

FIG. 13D exemplifies some direction vectors. The above-mentioned 3×3 pixel window is shifted to obtain several ten direction vectors. The vectors serve as the feature of a character. The feature vector is compared with the contents of a pre-stored character recognition dictionary to extract characters in the order from that having a feature closest to the feature vectors. In this case, the first candidate, second candidate, third candidate, . . . are obtained in the order from the feature closer to the feature vector. The closeness of the feature with respect to the feature vector is used as a numerical value representing the distance to that character, i.e., the degree of confidence (precision) of character recognition. In the character direction determination, the degree of confidence of character recognition is obtained. The character direction determination based on the degree of confidence will be described below using a text example "本発明の名称" shown in FIG. 14A.

FIG. 14B shows a text obtained by rotating a text in the true direction shown in FIG. 14A through 270°. When the character direction is to be determined for a character "本" character recognition is done for one character "本" from four directions, i.e., 0°, 90°, 180°, and 270°, as shown in FIG. 14C. These rotation angles can be set by changing the read direction of character rectangular regions, and the original need not be rotated. Different character recognition results are obtained at the individual rotation angles, as shown in FIG. 14C. Note that FIG. 14C shows imaginary character recognition results for descriptive purposes only, and their degrees of confidence do not always become as indicated in practice.

In FIG. 14C, when character recognition is done from the true direction (0°), "本" is correctly recognized, and the degree of confidence is as high as 0.90. When character "打" recognition is done from the 90° rotated direction, is erroneously recognized, and the degree of confidence drops to 0.40. Such recognition errors are generated and the degree of confidence drops since character recognition is done based on feature vectors viewed from the rotated direction. Similarly, when character recognition is done from the 180° and 270° rotated directions, recognition errors are produced, and the degrees of confidence drop. Note that the degrees of confidence have larger differences in the respective directions as the character to be recognized becomes more complicated.

Of the character recognition results shown in FIG. 14C, since the degree of confidence is highest in the true direction, it is determined that the document possibly points in the true direction. In order to improve the precision of the character direction determination, a plurality of characters in an identical block are similarly subjected to character recognition from the four directions. When the character direction is determined based on only one block, a wrong character direction may be determined due to a special character string. For this reason, similar character recognition is done for a plurality of blocks. The average values of the degrees of confidence in the four directions of the individual characters to be recognized in each character region are calculated, and also, the average values of the degrees of confidence in the four directions in each block are calculated. The direction corresponding to the largest average value is determined to be the character direction (document direction). In this manner, since the character direction is determined based on the degrees of confidence of a plurality of characters in a single block, and the degrees of confidence of a plurality of characters in other blocks in place of the degree of confidence of only one character, the document direction can be determined with high precision. Even when the character direction is determined based on the degree of confidence of only one character or based on the degrees of confidence of a plurality of characters in a single block, the character direction can be determined with higher precision than the conventional method.

Figure 15:
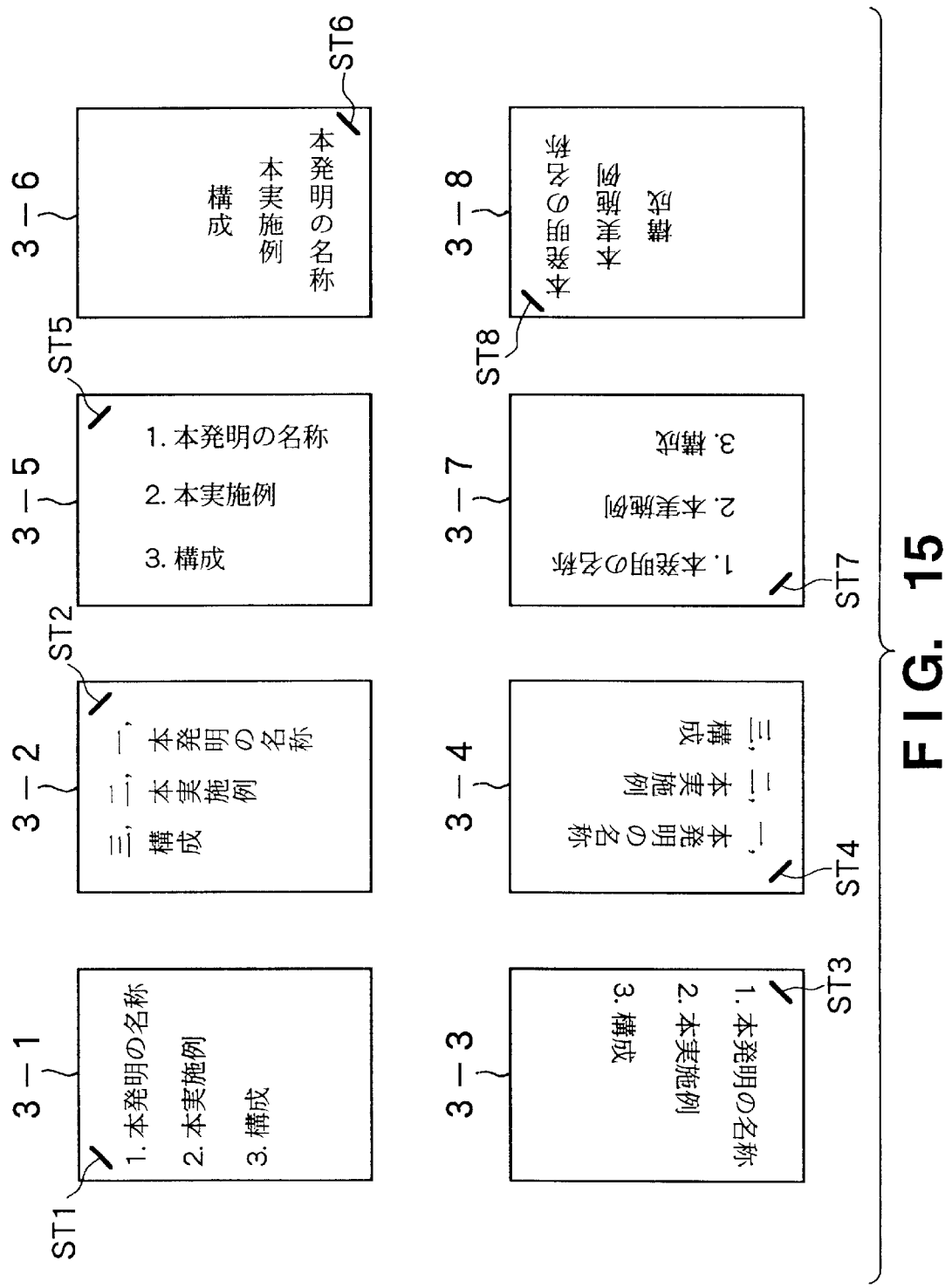
FIG. 15 shows various types of document contents on originals.

An example of processing for performing original direction detection in this embodiment and outputting copies will be described below. FIG. 15 shows various types of document contents on originals. FIG. 15 shows a horizontally written portrait document 3-1, a vertically written portrait document 3-2, documents 3-3 and 3-4 respectively obtained by rotating the documents 3-1 and 3-2 through 180°, a horizontally written landscape document 3-5, a vertically Written landscape document 3-6, and documents 3-7 and 3-8 respectively obtained by rotating the documents 3-5 and 3-6 through 180°. Copies of these documents are respectively stapled at positions ST1 to ST8 in FIG. 15 to avoid problems posed when they are read.

However, a stapling device shown in FIG. 6 can only staple at a position before the trailing end in the paper convey direction. For this reason, the directions of originals shown in FIG. 15 are detected to control image output directions.

Figure 16:
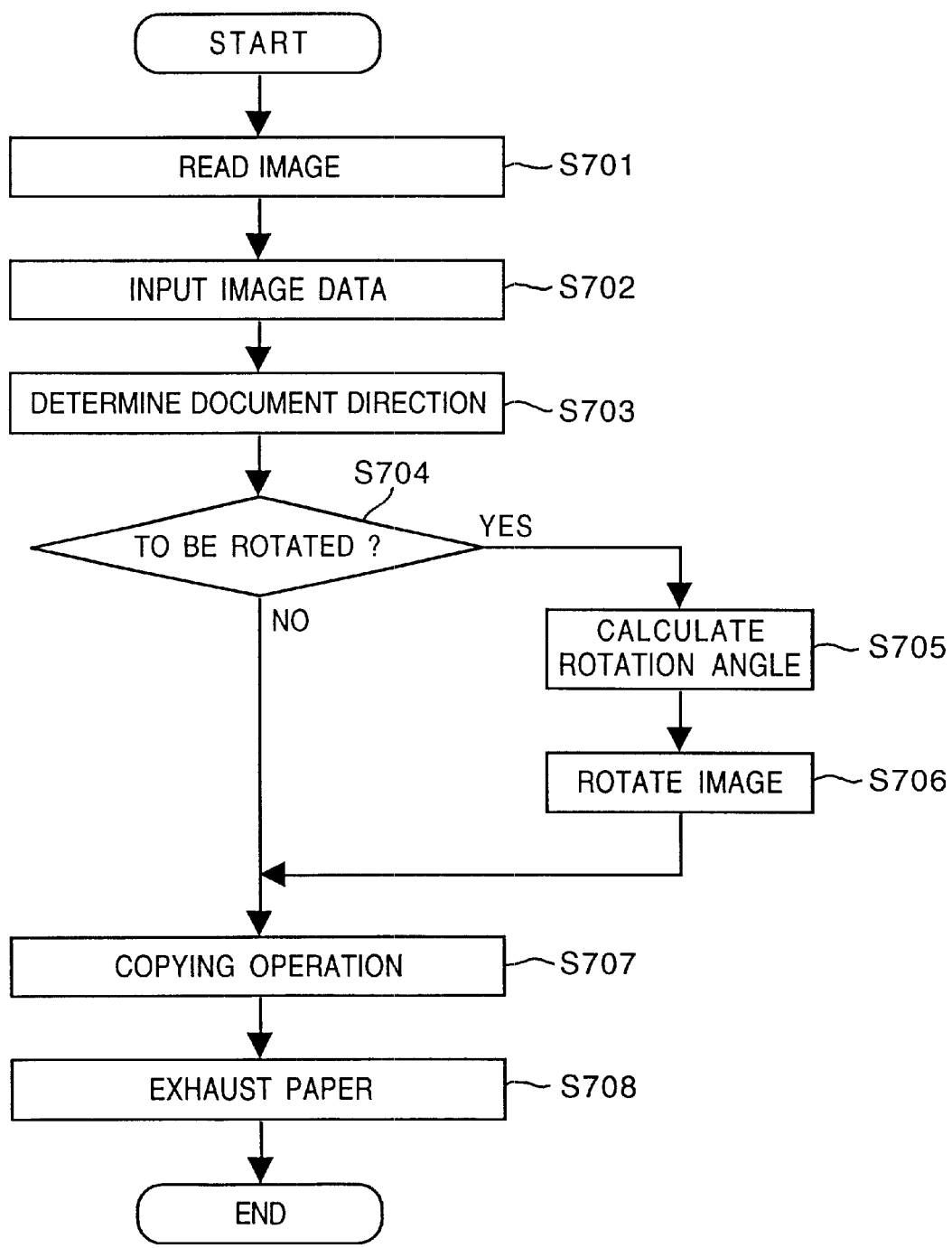
FIG. 16 is a flow chart showing copy rotation control in the first embodiment.

FIG. 16 is a flow chart showing copy rotation control in this embodiment. One original is optically read (step S701) to input image data (step S702). Thereafter, the document direction (up, down, right, left) of that original is determined based on the input image data (step S703). It is checked based on the determination result if the image data of the original is to be rotated (step S704). If it is determined that the image data is to be rotated, i.e., if the original is placed in a direction other than 3-1 and 3-8 shown in FIG. 15, the rotation angle of the image data is calculated from the determination result and the designated direction or reference direction (step S705), and the image data is rotated through the calculated rotation angle (step S706). Thereafter, copying is done (step S707), and a copy is exhausted (step S708). On the other hand, if it is determined that the image is not to be rotated, i.e., if the original is placed in a direction of 3-1 or 3-8 shown in FIG. 15, copying is done without rotating the image data (step S707), and a copy is exhausted (step S708).

The processing for determining the rotation angle of an image will be described below. When an original is placed in one of the directions shown in FIG. 15, and its image is read, if the image is not rotated, a sheet on which the image is formed is exhausted to have the left side in FIG. 15 as the trailing end and the top side as the front side. If it is determined based on the original direction determination result that the original has a direction of 3-1 in FIG. 15, since the image need not be rotated, the rotation angle is determined at 0°. If it is determined that the original has a direction of 3-2 in FIG. 15, image formation is done by rotating the image clockwise through 90° to have the top side in FIG. 15 as the trailing end and the right side as the front side when a sheet is exhausted. If it is determined that the original has a direction of 3-3 in FIG. 15, image formation is done by rotating the image 180° to have the right side in FIG. 15 as the trailing end and the bottom side as the front side when a sheet is exhausted. If it is determined that the original has a direction of 3-4 in FIG. 15, image formation is done by rotating the image counterclockwise through 90° to have the bottom side in FIG. 15 as the trailing end and the left side as the front side when a sheet is exhausted. Similarly, if it is determined that the original has a direction of 3-5 in FIG. 15, image formation is done by rotating the image clockwise through 90° to have the top side in FIG. 15 as the trailing end and the right side as the front side when a sheet is exhausted. If it is determined that the original has a direction of 3-6 in FIG. 15, image formation is done by rotating the image 180° to have the right side in FIG. 15 as the trailing end and the bottom side as the front side when a sheet is exhausted. If it is determined that the original has a direction of 3-7 in FIG. 15, image formation is done by rotating the image counterclockwise through 90° to have the bottom side in FIG. 15 as the trailing end and the left side as the front side when a sheet is exhausted. If it is determined that the original has a direction of 3-8 in FIG. 15, since the image need not be rotated, the rotation angle is determined at 0°. In this manner, when an image is rotated based on the original direction detection result, the staple direction can be adjusted to the image direction.

This embodiment has exemplified the processing upon stapling as an example of changing control by determining the original direction. Also, the present invention may be applied to a mode for laying out a plurality of original images on a single sheet.

Figure 17:
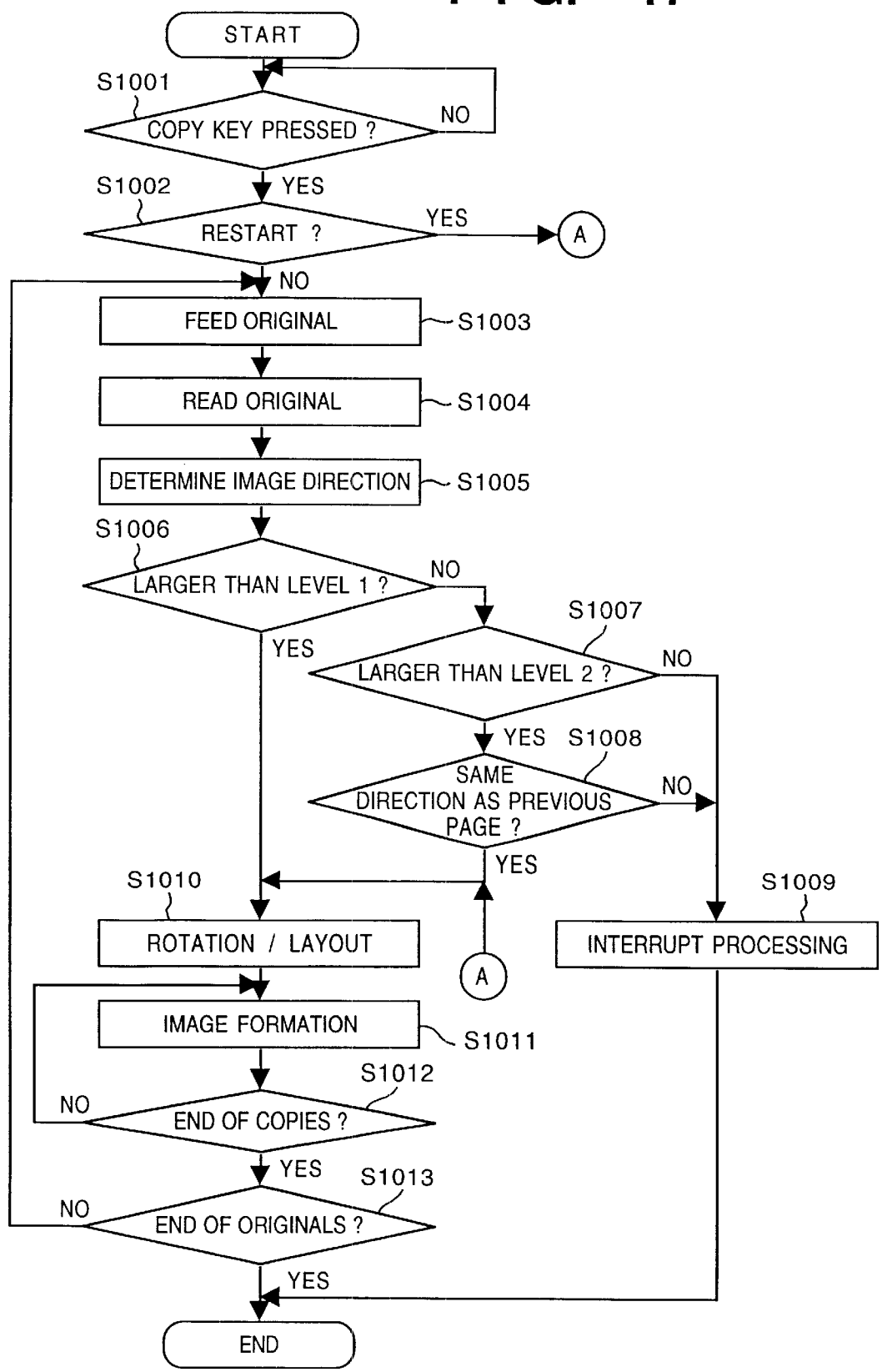
FIG. 17 is a flow chart showing the copying processing in the first embodiment.

Copying processing-in this embodiment will be described below. FIG. 17 is a flow chart showing the copying processing in this embodiment. Note that this processing is called from a main routine at a predetermined time interval or as needed.

In step S1001, it is checked if the operator has pressed the copy key. If NO in step S1001, the flow returns to step S1001 and the control waits until the copy is pressed. Thereafter, if it is determined in step S1001 that the operator has pressed the copy key, the flow advances to step S1002 to check if depression of the copy key instructs to restart previously interrupted processing. If YES in step S1002, since an original image has already been read, the flow jumps to step S1010, and the output direction and layout direction of the image are controlled in accordance with the direction of the original image designated by the operator before depression of the start key. The flow then advances to step S1011 to perform image formation.

On the other hand, if NO in step S1002, the flow advances to step S1003, and the RDF 180 conveys an original onto the platen glass 101. Thereafter, the flow advances to step S1004, and the original on the platen glass 101 is scanned to input original image data to the electronic sorter 203 and the image direction detector 210. The electronic sorter 203 binarizes the read image data and stores the binary image data in the memory, as described above. Thereafter, in step S1005, the image direction detector 210 determines the direction of the original image and its degree of confidence. It is checked in step S1006 if the degree of confidence of the original image direction determined in step S1005 is larger than level 1 (to be described later) set by the operator. If YES in step S1006, the flow advances to step S1010. On the other hand, if NO in step S1006, the flow advances to step S1007 to check if the degree of confidence is larger than level 2 (to be described later) set by the operator. If YES in step S1007, the flow advances to step S1008 to check if the original image direction is the same as that of the previous page. If YES in step S1008, the flow advances to step S1010. On the other hand, if NO in step S1007, or if NO in step S1008, the flow advances to step S1009 to execute interrupt processing. More specifically, since the original image direction cannot be determined, the image forming operation is interrupted, a portion of the original image obtained by reducing the image, the direction of which cannot be determined, to a scale that can be recognized by the operator, is displayed on the display panel 469 of the console, and a message for prompting the operator to designate the direction of the original image is displayed. Although a detailed description is not given, the printer stops its driving after the paper sheet that has been fed is exhausted.

In step S1010, an image is rotated in correspondence with the copy mode designated at the console, and the layout direction is determined in accordance with the original image direction. In step S1011, image formation is done. Although a detailed description is omitted herein, a paper sheet is fed from the above-mentioned paper feed cassette, and the image formation is done in correspondence with the fed paper sheet in a processing flow different from this control flow. Thereafter, it is checked in step S1012 if copies corresponding to a copy count set at the console have been formed. If NO in step S1012, the flow returns to step S1011 to repeat the above-mentioned image formation. On the other hand, if YES in step S1012, the flow advances to step S1013 to check if a bundle of originals stacked on the RDF 180 are fed until their last page. If the last page is not fed yet, the flow returns to step S1003 to repeat the above-mentioned processing from feeding of an original. On the other hand, if the last page has already been fed, the image forming operation ends.

Figure 18:
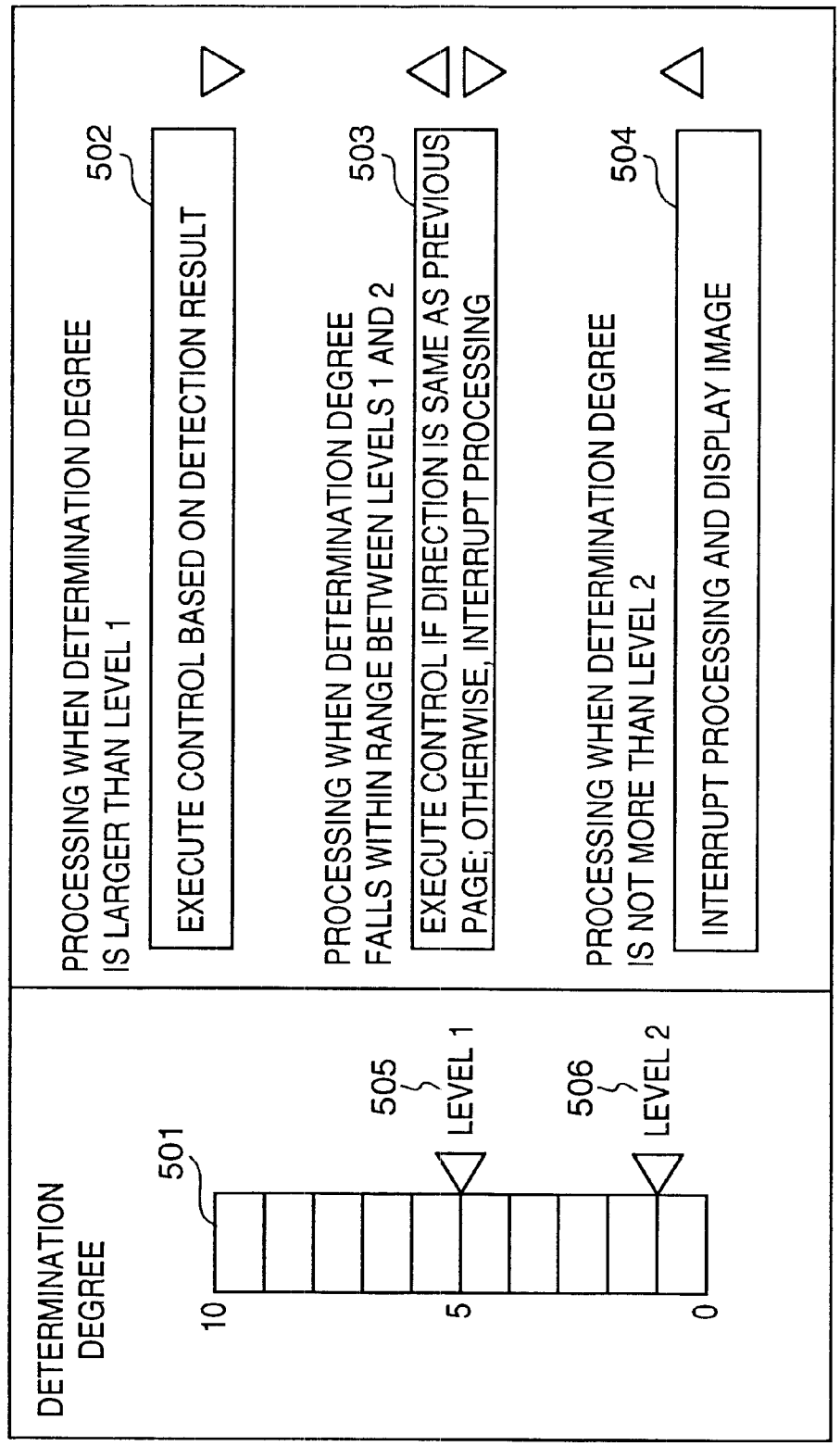
FIG. 18 shows a setting screen displayed on a display panel 469 on the console.

An operation by the operator to set levels 1 and 2 described above will be explained below. FIG. 18 shows the setting screen displayed on the display panel 469 of the console. In FIG. 18, reference numeral 501 denotes an indicator used for setting the level for switching the degree of confidence in image direction determination. This indicator indicates the degree of confidence for determination in 11 degrees from "0" to "10". At degree "0", the image direction cannot be determined, and at degree "10", the degree of confidence for determination of the image direction is maximum. The degree of confidence between these two degrees is divided into 10 degrees. Reference numerals 505 and 506 respectively denote degree-of-confidence designation levels 1 and 2 in image direction determination shown in FIG. 17. Using the cursor keys on the console, the operator can select these two levels from degrees "0" to "10". Reference numerals 502, 503, and 504 denote operation content setting items, which respectively indicate setting contents of processing executed when the degree of confidence is larger than level 1, when the degree of confidence is not larger than level 1 but is larger than level 2, and when the degree of confidence is not larger than level 2.

These processing contents can be selected from some choices by selecting each item and using the cursor keys. Identical processing contents may be set at the individual levels. At the selected item, an arrow or arrows are displayed in a direction or directions to be able to select other processing contents.

In FIG. 18, at the selection item 502, the selected processing contents can be changed to other ones using the down cursor key, and no more processing contents are available in the direction of the up cursor key. At the selection item 503, choices are available in both the directions of the up and down cursor keys, and at the selection item 504, the processing contents can be changed using only the up cursor key. The processing contents shown in FIG. 18 correspond to items of the control flow shown in FIG. 17, and the processing in the control flow after checking steps S1006 and S1007 in FIG. 17 changes depending on the contents of these setting items.

In the first embodiment, the degree of confidence upon determination of the original image direction is divided into three levels, and the operator designates processing contents at these levels. Also, the degree of confidence may be divided into a larger number of levels. Conversely, processing may be done using only two levels, i.e., the degree "0" of confidence and a level other than "0". In this case, the processing contents are designated in correspondence with a case wherein determination of the original image direction has failed, and a case other than this case.

In place of selecting the processing contents at the individual determination levels of the original image direction from menu items, the processing contents may be designated more finely.

Figure 19:
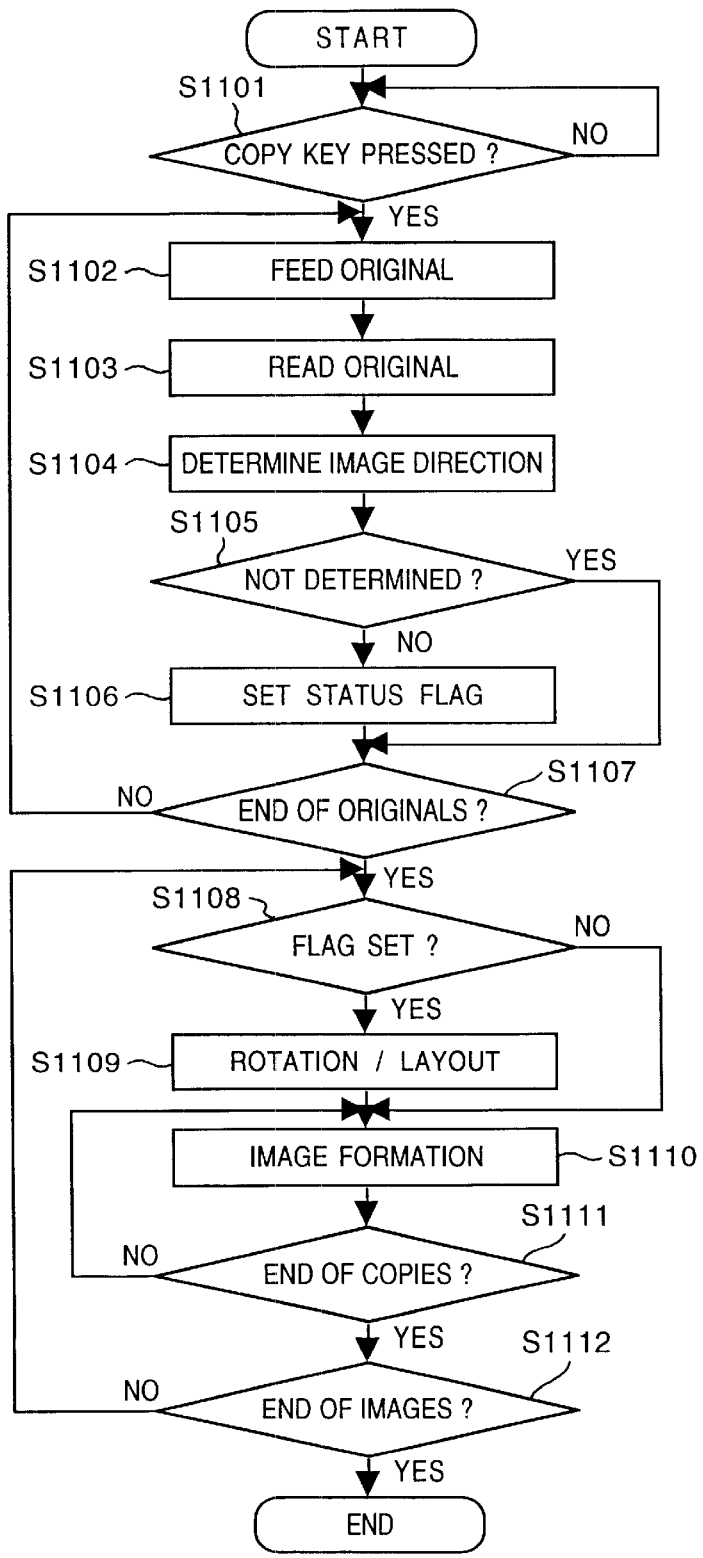
FIG. 19 is a flow chart showing the copying processing according to a modification of the first embodiment.

As a modification of the first embodiment, a case will be described below wherein image formation is not interrupted when determination of the original image direction fails. The setting method is the same as that in this embodiment. FIG. 19 is a flow chart showing the copying processing in this modification. Note that this processing is called from a main routine at a predetermined time interval or as needed.

In step S1101, it is checked if the operator has pressed the copy key. If NO in step S1101, the flow returns to step S1101 and the control waits until the copy is pressed. Thereafter, if it is determined in step S1101 that the operator presses the copy key, the flow advances to step S1102, and the RDF 180 feeds an original onto the platen glass 101. Thereafter, the flow advances to step S1103, and the original on the platen glass 101 is scanned to input original image data to the electronic sorter 203 and the image direction detector 210. The electronic sorter 203 binarizes the read image data and stores the binary image data in the memory, as described above. Thereafter, in step S1104, the image direction detector 210 determines the direction of the original image and its degree of confidence, and stores them in correspondence with the original image data stored in the electronic Sorter 203.

It is checked in step S1105 based on the degree of confidence of the original image direction determined in step S1104 if original direction determination has been successful. This corresponds to a case wherein both levels 1 and 2 are set at degree "0" of confidence in the above-mentioned embodiment. If the original image direction is successfully determined, the flow advances to step S1106, and a status flag indicating the original, the original image direction of which can be determined, is set. On the other hand, if determination of the original image direction fails, the flow advances to step S1107 to check if the read original is the last original. If NO in step S1107, the flow returns to step S1102 to repeat the above-mentioned processing until the last original is read.

On the other hand, if YES in step S1107, the flow advances to step S1108 to check if the above-mentioned status flag is set. Note that no status flag is set when the original image direction cannot be determined. In such case, the flow jumps to step S1110 without rotating an image or changing the layout, and the original image is copied in its read direction. On the other hand, if the status flag is set, the flow advances to step S1109 to rotate an image in correspondence with the copy mode designated at the console and to determine the layout direction in accordance with the original image direction determined in step S1104. Note that the original, the original image direction of which cannot be determined in step S1104, is controlled using the directions of original images before and after the original image of interest. Although a detailed description is omitted herein, a paper sheet is fed from the above-mentioned paper feed cassette, and the image formation is done in correspondence with the fed paper sheet in a processing flow different from this control flow.

It is then checked in step S1111 if copies corresponding to a copy count set at the console have been formed. If NO in step S1111, the flow returns to step S1110 to repeat image formation. On the other hand, if YES in step S1111, the flow advances to step S1112 to check if image formation has been done for all the originals. If NO in step S1112, the flow returns to step S1108 to repeat the processing for the next original image. On the other hand, if YES in step S1112, this image forming operation ends.

This processing can obtain the same effect as in the above embodiment even when the degree of confidence of the original image direction is near the level at which determination of the original image direction fails.

As another embodiment, at the level at which determination of the original image direction fails, image formation may be done in an output direction pre-set by the operator in correspondence with the original size.

As described above, according to the first embodiment, since image forming processing for adjusting a bundle of copies with respect to a bundle of originals by rotating or laying out images in accordance with the recognized original image directions and controlling the staple direction is set in correspondence with the degree of confidence of recognition of the original image direction detection means, even when image directions are erroneously detected due to the presence of various types of originals, control designated by the operator can be accomplished in correspondence with the degree of confidence, and copies that the operator intended can be obtained.

The second embodiment according to the present invention will be described below with reference to the accompanying drawings.

This embodiment will exemplify a copying machine as an image forming apparatus, but the present invention is not limited to this.

Figure 20:
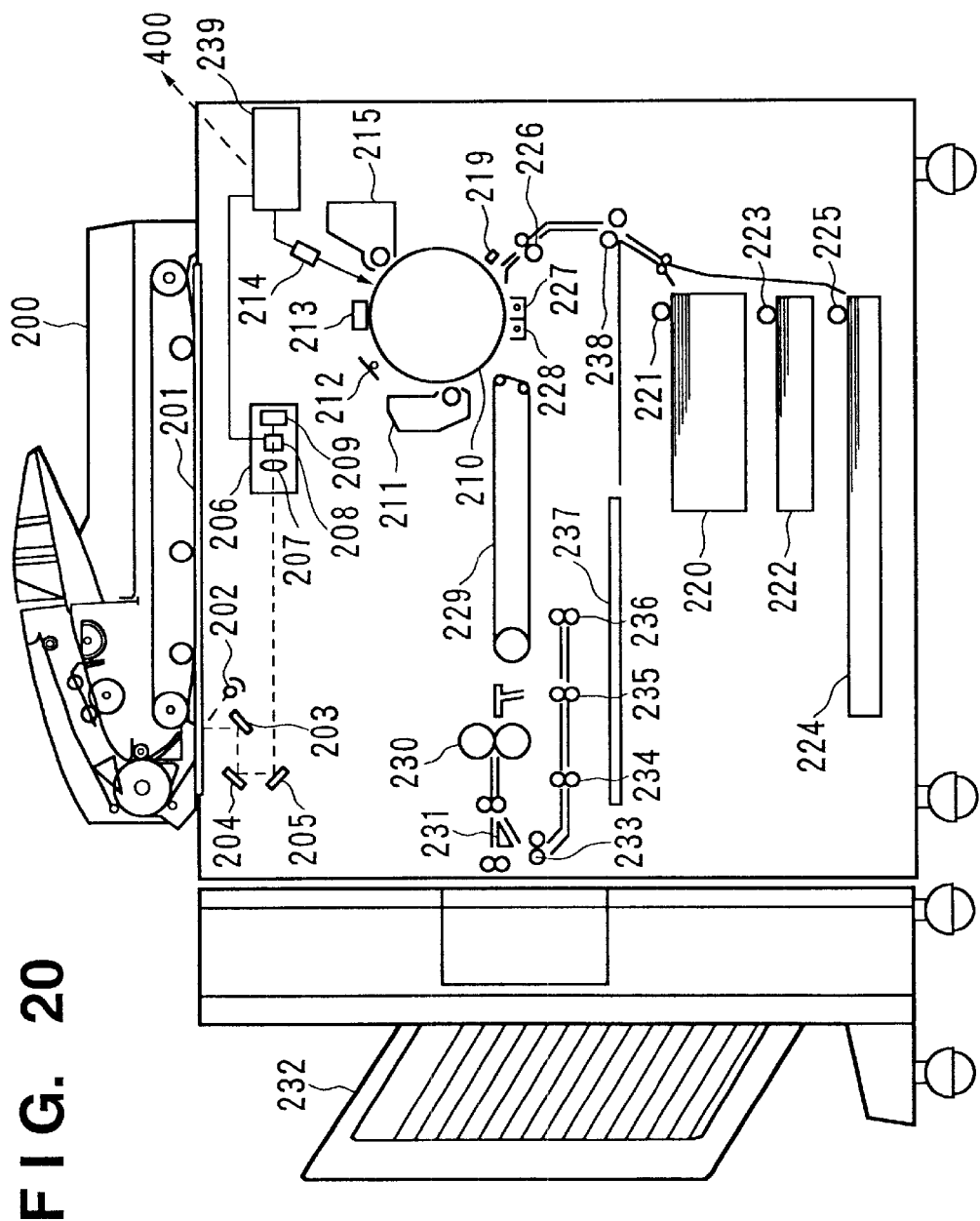
FIG. 20 is a sectional view showing the structure of a copying machine according to the second embodiment of the present invention.

FIG. 20 is a schematic view showing the structure of a copying machine according to this embodiment. Referring to FIG. 20, reference numeral 200 denotes an automatic document feeder (to be referred to as a DF hereinafter) which can automatically feed a plurality of originals one by one, and can sequentially set the front and back surfaces of each original. Since the detailed arrangement of the DF is already known to those who are skilled in the art, a detailed description thereof will be omitted. A plurality of originals to be read are set on the DF 200. The originals set on the DF 200 are fed one by one by the DF 200, and each original is placed on a platen 201. Reference numeral 202 denotes an original illumination lamp which comprises, e.g., a halogen lamp, and exposes an original placed on the platen 201. Reference numerals 203, 204, and 205 denote scanning mirrors, which are housed in an optical scanning unit (not shown) and guide light reflected by an original toward a CCD unit 206 while being reciprocally moved. The CCD unit 206 comprises an imaging lens 207 for imaging light reflected by the original on a CCD, an image sensing element 208 consisting of a CCD, a CCD driver 209 for driving the image sensing element 208, and the like. An image signal output from the image sensing element 208 is converted into, e.g., 8-bit digital data, which is input to a controller 239. The controller 239 comprises a microcomputer, image processing unit, and the like (to be described later), and forms images in accordance with an instruction from a control panel (to be described later). Note that the controller 239 will be described in detail later.

Reference numeral 210 denotes a photosensitive drum, which is charge-removed by a pre-exposure lamp 212 to prepare for image formation. Reference numeral 213 denotes a charger for uniformly charging the photosensitive drum 210. Reference numeral 214 denotes an exposure means, which comprises, e.g., a semiconductor laser and the like, and exposes the photosensitive drum 210 on the basis of image data processed by the controller 239 for controlling image processing and the entire apparatus, thus forming an electrostatic latent image. Reference numerdl 215 denotes a developer which stores black developing agent (toner). Reference numeral 219 denotes a pre-transfer charger for applying high voltages before a toner image developed on the photosensitive drum 210 is transferred onto a paper sheet. Reference numerals 220, 222, and 224 denote paper feed units, from each of which a transfer paper sheet is fed into the apparatus by driving a corresponding one of paper feed rollers 221, 223, and 225. The fed paper sheet temporarily stops at the position of registration rollers 226, and is then fed again in synchronism with the write-start timing of the image formed on the photosensitive drum 210.

Reference numeral 227 denotes a transfer charger for transferring a toner image developed on the photosensitive drum 210 onto the fed transfer paper sheet. Reference numeral 228 denotes a peeling charger for peeling the transfer paper sheet, on which the image has been transferred, from the photosensitive drum 210. The residual toner on the photosensitive drum 210 is recovered by a cleaner 211. Reference numeral 229 denotes a transfer belt for conveying the transfer paper sheet that has been subjected to the transfer process. Reference numeral 230 denotes a fixing device which fixes the toner image transferred onto the transfer sheet by, e.g., heat. Reference numeral 231 denotes a flapper for switching the convey path of the transfer paper sheet that has been subjected to the fixing process to control if copying is to end and the sheet is to be exhausted outside the copying machine, or the transfer sheet is to be conveyed toward the position of an intermediate tray 237. Reference numerals 233 to 236 denote feed rollers for feeding the transfer paper sheet that has been subjected to the fixing process once to the intermediate tray 237 in a reversed (multiple copying) or non-reversed (two-sided copying) state. Reference numeral 238 denotes a re-feed roller which conveys the transfer paper sheet placed on the intermediate tray 237 to the position of the registration rollers 226 again. Reference numeral 232 denotes a staple sorter for sorting and stapling copied paper sheets.

[Controller]

Figure 21:
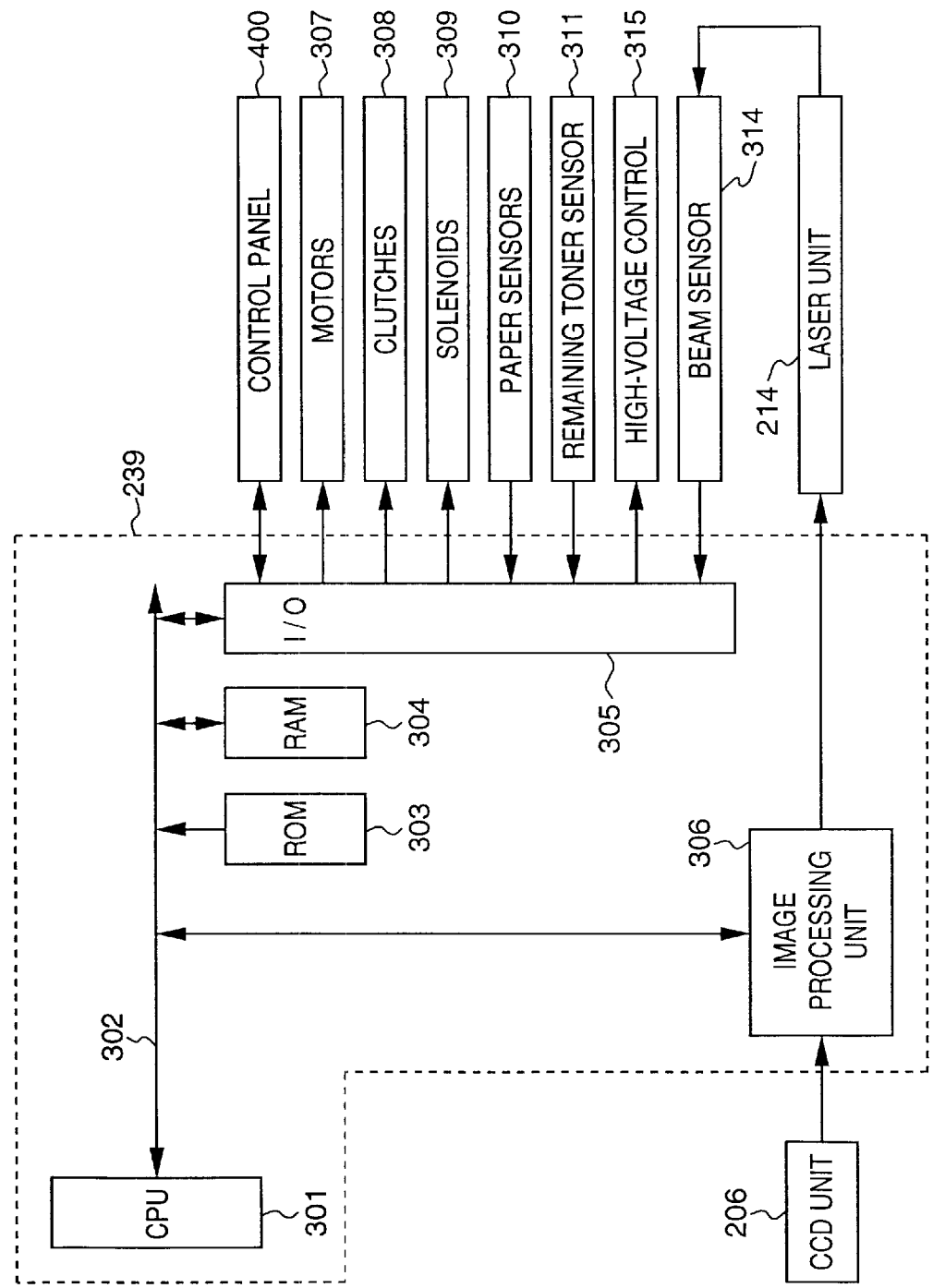
FIG. 21 is a block diagram showing the arrangement of a controller unit 239 in the second embodiment.

The detailed arrangement of the controller 239 will be explained below. FIG. 21 is a block diagram showing the arrangement of the controller 239 of this embodiment. In FIG. 21, reference numeral 301 denotes a CPU for controlling the entire apparatus. The CPU 301 sequentially reads out the control sequences (control programs) of the apparatus main body from a ROM (to be described later) and executes them. Reference numeral 302 denotes a CPU bus to which the individual units are connected. Reference numeral 303 denotes a read-only memory (ROM) that stores programs and control data. Reference numeral 304 denotes a random-access memory (RAM) that serves as a main memory device, and is used for storing input data and as a work area. Reference numeral 305 denotes an I/O interface for controlling interfacing with a control panel and various sensors connected thereto. More specifically, the I/O interface 305 is connected with a control panel 400 at which the operator makes key inputs and which displays the status and the like of the apparatus using a liquid crystal display and LEDs, motors 307, clutches 308, and solenoids 309 which drive the paper feed system, convey system, and optical system, paper sensors 310 for detecting the conveyed paper sheet, a remaining toner sensor 311 for detecting the toner amount in the developer 215, a high-voltage control unit 315 for outputting high voltages to the above-mentioned charger, developer, pre-transfer charger, transfer charger, and peeling charger, and a beam sensor 314.

Reference numeral 306 denotes an image processor which receives an image signal output from the CCD unit 206, and performs various kinds of image processing (to be described later). The image processor 206 outputs a control signal for the exposure means (laser unit) 214 in accordance with image data. A laser beam output from the laser unit 214 is irradiated onto the photosensitive drum 210.

[Image Processor]

Figure 22:
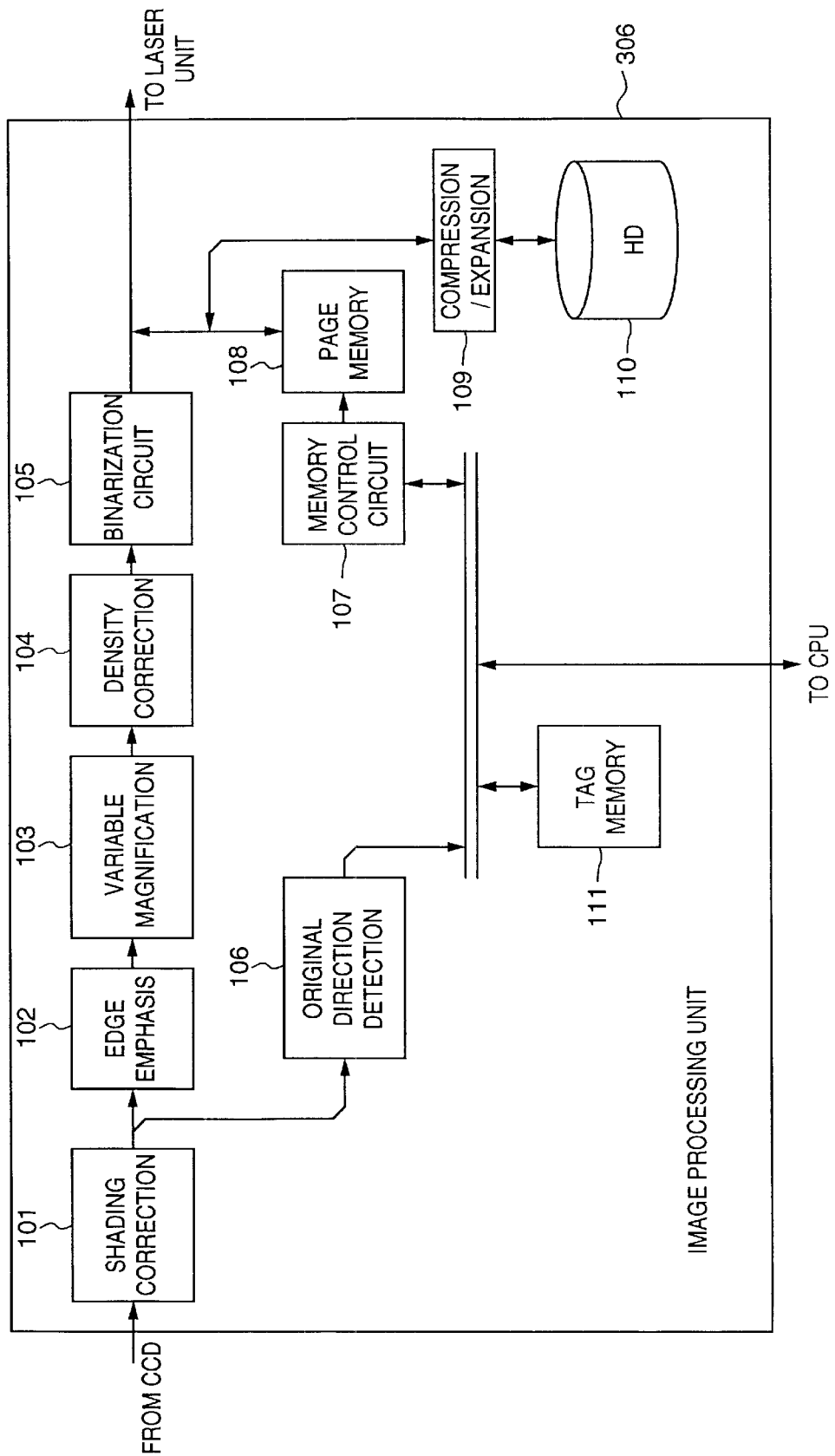
FIG. 22 is a block diagram showing the arrangement of an image processing unit 306 in the second embodiment.

The image processor 306 will be described in detail below. FIG. 22 is a block diagram showing the arrangement of the image processor 306 of this embodiment. An image signal which is converted into an electrical signal by the CCD unit 206 is input to a shading correction circuit 101 to correct variations among pixels. Thereafter, an edge emphasis circuit 102 calculates the second derivative of the image signal using, e.g., a 5×5 window, thereby emphasizing the edge of an image. Furthermore, a variable magnification circuit 103 decimates data in a reduction copying mode, or interpolates data in an enlargement copying mode. Subsequently, a density correction circuit 104 converts the image data into desired density data, and a binarization circuit 105 binarizes the density data. Note that a simple binarization method, screen method, error diffusion method, or any other methods may be used as the binarization method. The binarized image signal is supplied to the laser unit 214 or is held in a page memory 108.

The image signal held in the page memory 108 is input to a compression/expansion circuit 109 to Compress its information volume, and the compressed image signal is sequentially stored in a large-capacity hard disk 110. Originals set on the DF 200 are fed in turn onto the platen, are read, and are then supplied to the compression/expansion circuit 109 via the binarization circuit 105 and the page memory 108 described above. The compression/expansion circuit 109 compresses input image signals, and supplies the compressed signals to the hard disk 110. The hard disk 110 sequentially stores a plurality of input compressed image signals. Furthermore, the compressed image signals held in the hard disk 110 are sequentially read out, are expanded by the compression/expansion circuit 109, and are temporarily supplied to the page memory 108. Then, the image signals are sent to the laser unit 214, thus forming images.

The data compression/expansion method in the compression/expansion circuit 109 is not particularly limited, and any methods may be used. Note that image signals are compressed to obtain the following two merits, i.e., to hold image signals on the hard disk 110 as much as possible by reducing the information volume per page of image data, and to improve the productivity of the apparatus by shortening the time required for accessing the hard disk 110.

The above-mentioned control such as editing for a reduced-scale layout is done on the page memory 108 after image signals are temporarily stored in the page memory 108, and the processed image signals are output to the laser unit 214. The editing on the page memory is attained by controlling address signals and enable signals to be supplied to the memory 108 by a memory control circuit 107.

On the other hand, an original direction detector 106 determines the placing direction (up, down, right, left) of an original and the writing direction (vertical writing or horizontal writing) of characters on the original on the basis of the image signal from the shading correction circuit 101. The determination result is held in a TAG memory 111.

The CPU 301 reads out the determination result held in the TAG memory 111 and supplies an instruction to the memory control circuit 107 on the basis of the readout result. Based on the instruction from the CPU 301, the memory control circuit 107 edits image signals on the memory 108.

[Control Panel]

Figure 23:
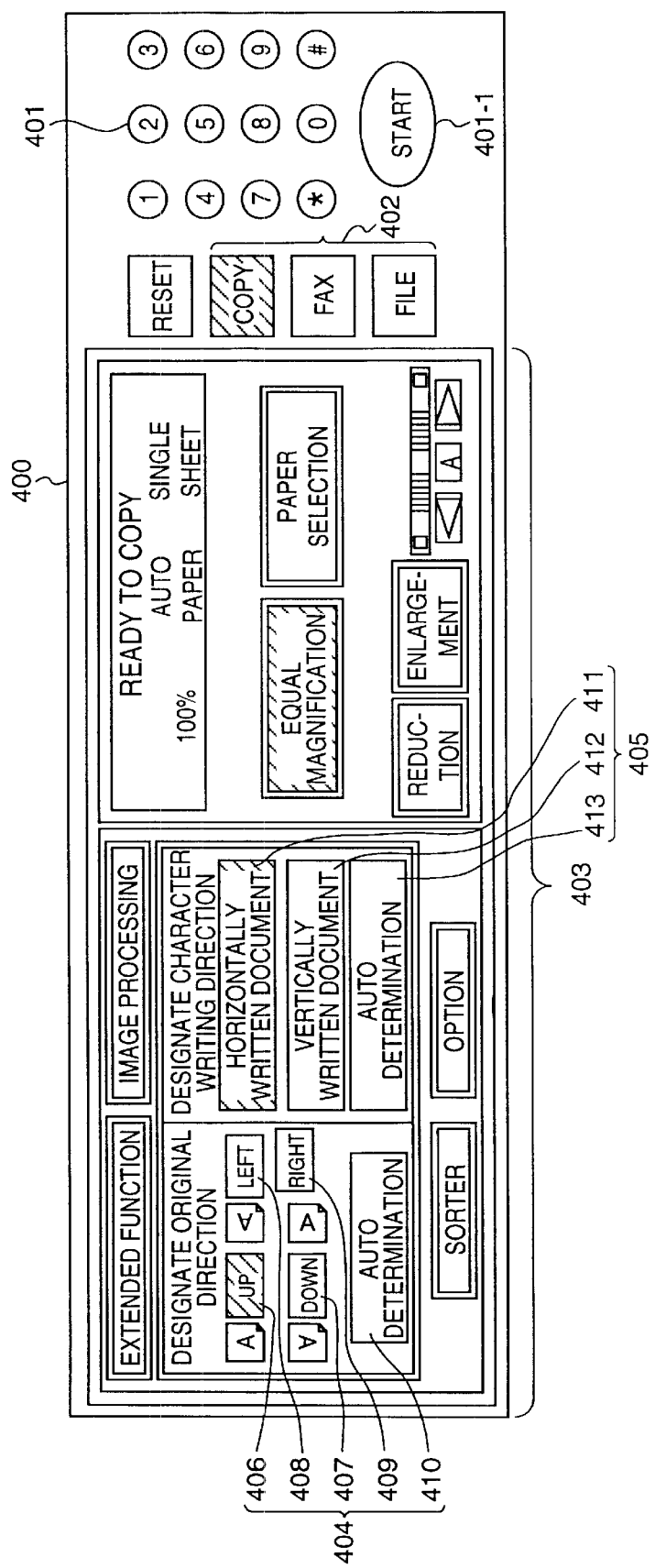
FIG. 23 is a plan view showing the arrangement of a control panel 400 in the second embodiment.

The arrangement of the control panel 400 of this embodiment will be described below. FIG. 23 shows the outer appearance of the control panel 400 of this embodiment. In FIG. 23, reference numeral 401 denotes a ten-key pad used for setting required numerical values such as a copy count, and the like; and 401-1, a copy start key used for instructing to start copying. Reference numeral 403 denotes a large-size liquid crystal touch panel, which displays keys on a liquid crystal display. The operator presses the displayed keys with his or her finger to instruct a desired operation. Reference numerals 404 to 413 denote keys, which relate to the present invention, among those displayed on the liquid crystal touch panel 403. Note that a description of keys that do not directly relate to the present invention will be omitted.

Reference numeral 404 denotes a key group for designating the original direction. The operator uses the key group 404 to designate the original direction with reference to himself or herself. The key group 404 includes an up designation key 406, down designation key 407, left designation key 408, right designation key 409, and automatic determination key 410. When the operator selectively presses one of the keys 406 to 410, the selected key is highlighted to indicate the choice being made. In the example shown in FIG. 23, the up designation key 406 is designated. When one of the keys 406 to 409 is selected, it is determined that originals are placed in the designated direction so as to control the apparatus accordingly. When the automatic determination key 410 is selected, control is executed assuming that the direction determined by the original direction detection unit 106 is designated.

Furthermore, reference numeral 405 denotes a key group used for designating the writing direction of characters on the original, i.e., for designating if the original is a vertically written original or horizontally written original. The key group 405 includes a horizontal writing designation key 411, a vertical writing designation key 412, and an automatic determination key 413. When the operator selectively presses one of the keys 411, 412, and 413, the selected key is highlighted to indicate the choice being made. In the example shown in FIG. 23, the horizontal writing designation key 411 is selected. When one of the horizontal and vertical writing designation keys 411 and 412 is selected, it is determined that the writing direction of characters on the original is the designated direction so as to control the apparatus accordingly. When the automatic determination key 413 is selected, it is determined that the writing direction of characters determined by the original direction detection unit 106 is designated, and control is performed accordingly.

[Control Based on Designated Original Direction]

Figure 24:
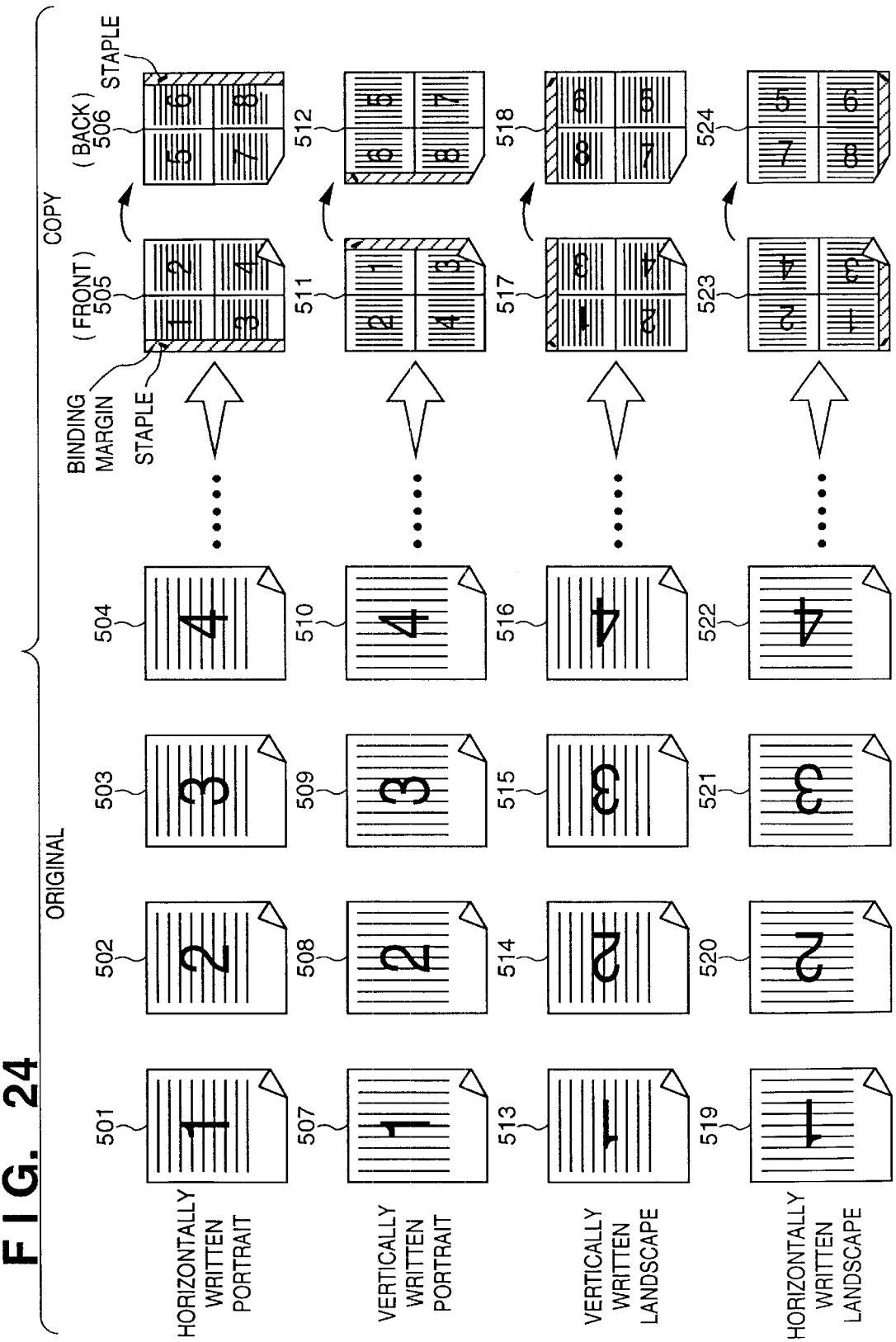
FIG. 24 is a view for explaining reduced-scale layout/ two-sided copying control in the second embodiment.

The reduced-scale layout/two-sided copying control in this embodiment will be explained below. FIG. 24 is a view for explaining the reduced-scale layout/two-sided copying control of this embodiment. This control is done as editing of images on the page memory 108 under the control of the memory control circuit 107 on the basis of an instruction from the CPU 301. That is, the layout, binding margin, stapling position, and the like are controlled on the basis of the placing direction of originals and vertical writing/horizontal writing designated by the operation at the control panel 400 or the original direction detector 106.

In FIG. 24, reference numerals 501, 502, 503, 504, . . . denote a plurality of horizontally written portrait originals. When these originals are set on the automatic document feeder (DF) in the illustrated direction, original images are copied in a layout 505 on the front side and in a layout 506 on the back side to have a binding margin, and copies are stapled at a desired position. Note that "1", "2", "3", "4", . . . , "8" in FIG. 24 correspond to the order of originals, i.e., the pages of originals.

On the other hand, reference numerals 507, 508, 509, 510, . . . denote a plurality of vertically written portrait originals. When these originals are set on the DF in the illustrated direction, original images are copied in a layout 511 on the front side and in a layout 512 on the back side to have a binding margin, and copies are stapled at a desired position.

Similarly, in the case of vertically written landscape originals 513, 514, 515, 516, . . . , original images are copied in a layout 517 on the front side and in a layout 518 on the back side to have a binding margin, and copies are stapled at a desired position. Likewise, in the case of horizontally written landscape originals 519, 520, 521, 522, . . . , original images are copied in a layout 523 on the front side and in a layout 524 on the back side to have a binding margin, and copies are stapled at a desired position.

As combinations not shown in FIG. 24, for example, originals may be placed with their top side pointing down, and the layout, binding margin, stapling position, and the like of such originals can be similarly controlled as in the above-mentioned cases.

Figure 25:
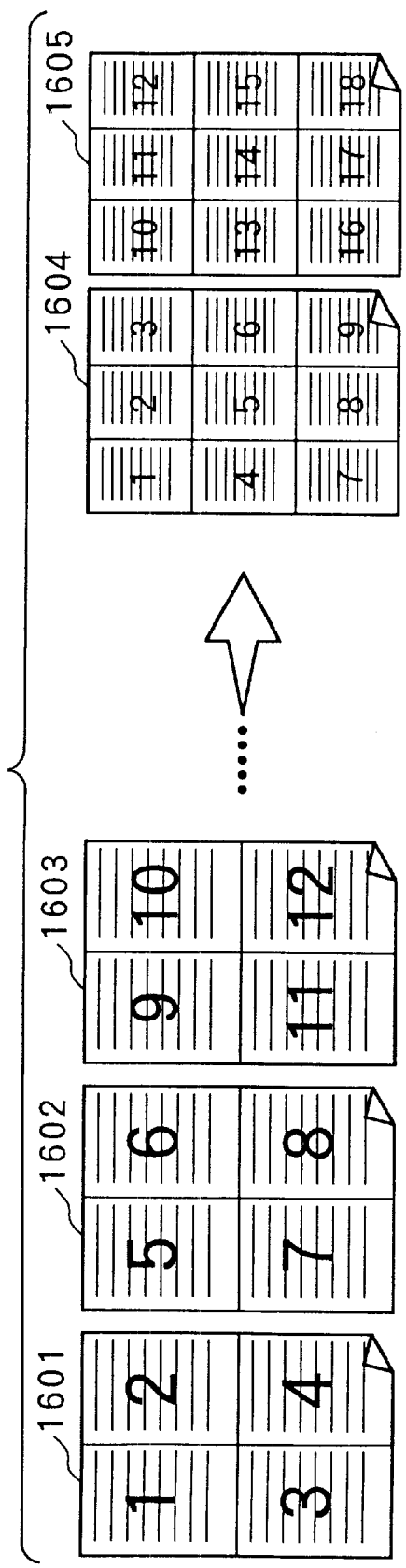
FIG. 25 shows the re-layout results of original images which have already been copied in reduced-scale layouts.

FIG. 25 shows the re-layout results of originals which have already been copied in a reduced-scale layout. In FIG. 25, reference numerals 1601, 1602, 1603, . . . denote originals which have already been copied in a 4-in-1 layout. Reference numerals 1604 and 1605 denote copies in a 9-in-1 layout which are obtained by sequentially reading the original images in the reduced-scale layout, dividing the read original images into four blocks, and laying them out again. Whether or not the original images are already copied in a reduced-scale layout may be determined by automatic detection or by a designation from the control panel 400.

Figure 26:
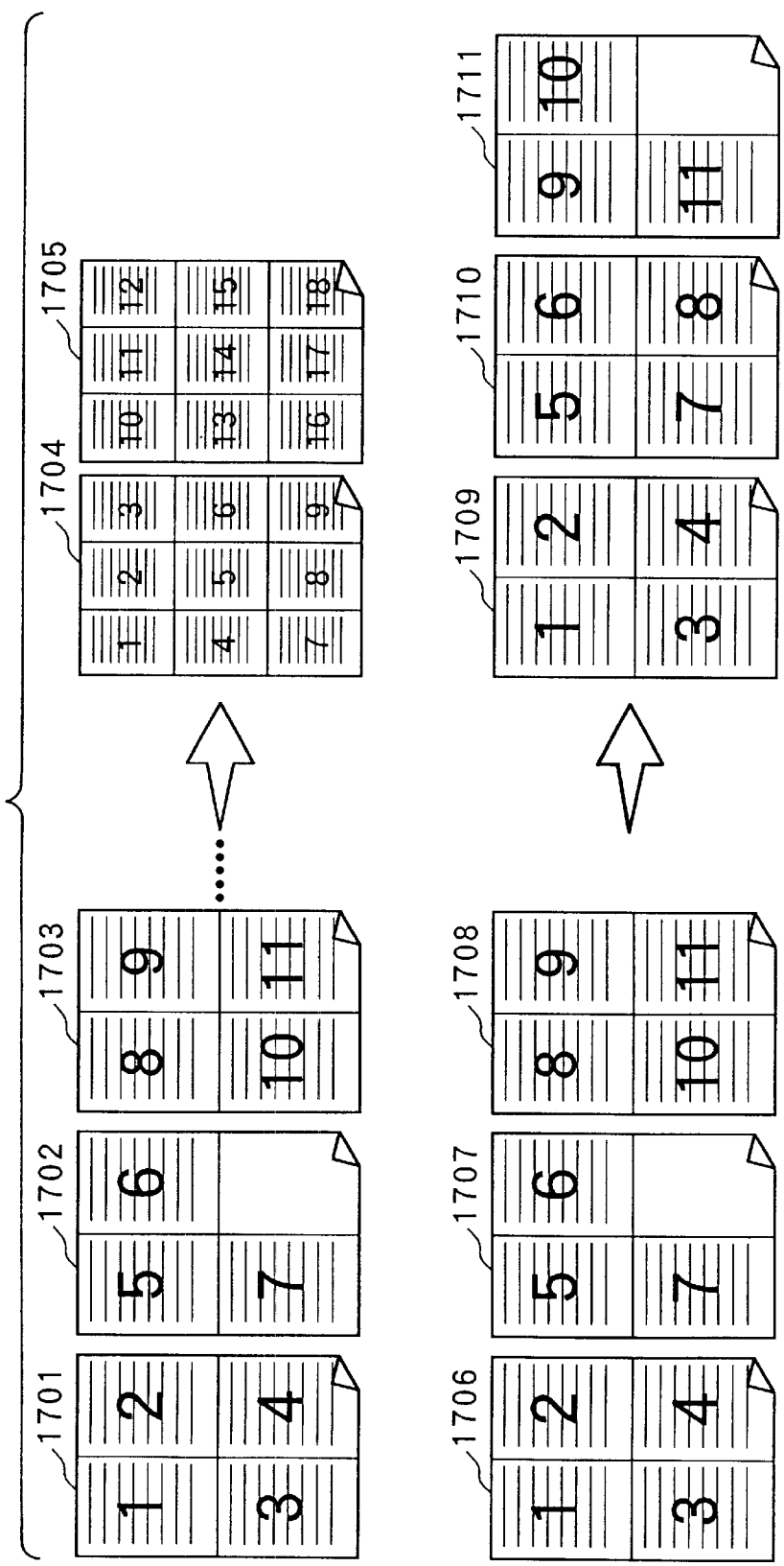
FIG. 26 shows modifications of the re-layout results shown in FIG. 25.

FIG. 26 shows a modification of the re-layout results shown in FIG. 25. In FIG. 26, it is checked if each original includes a blank block, and if a blank block is found, the images are laid out again while removing the blank block. Reference numerals 1701, 1702, 1703, . . . in FIG. 26 denote originals which have already been copied in a 4-in-1 reduced-scale layout. The original 1702 includes on blank block. More specifically, the original 1701 includes four blocks 1, 2, 3, and 4, the original 1702 includes three blocks 5, 6, and 7, and the original 1703 includes four blocks 8, 9, 10, and 11. Reference numeral 1704 and 1705 respectively denote copies in 9-in-1 layout obtained by sequentially reading the originals in the reduced-scale layout, and laying them out again. Reference numerals 1709, 1710, and 1711 denote copies in a 4-in-1 layout similarly obtained by laying out original images again by removing the blank block in an original 1707.

Figure 27:
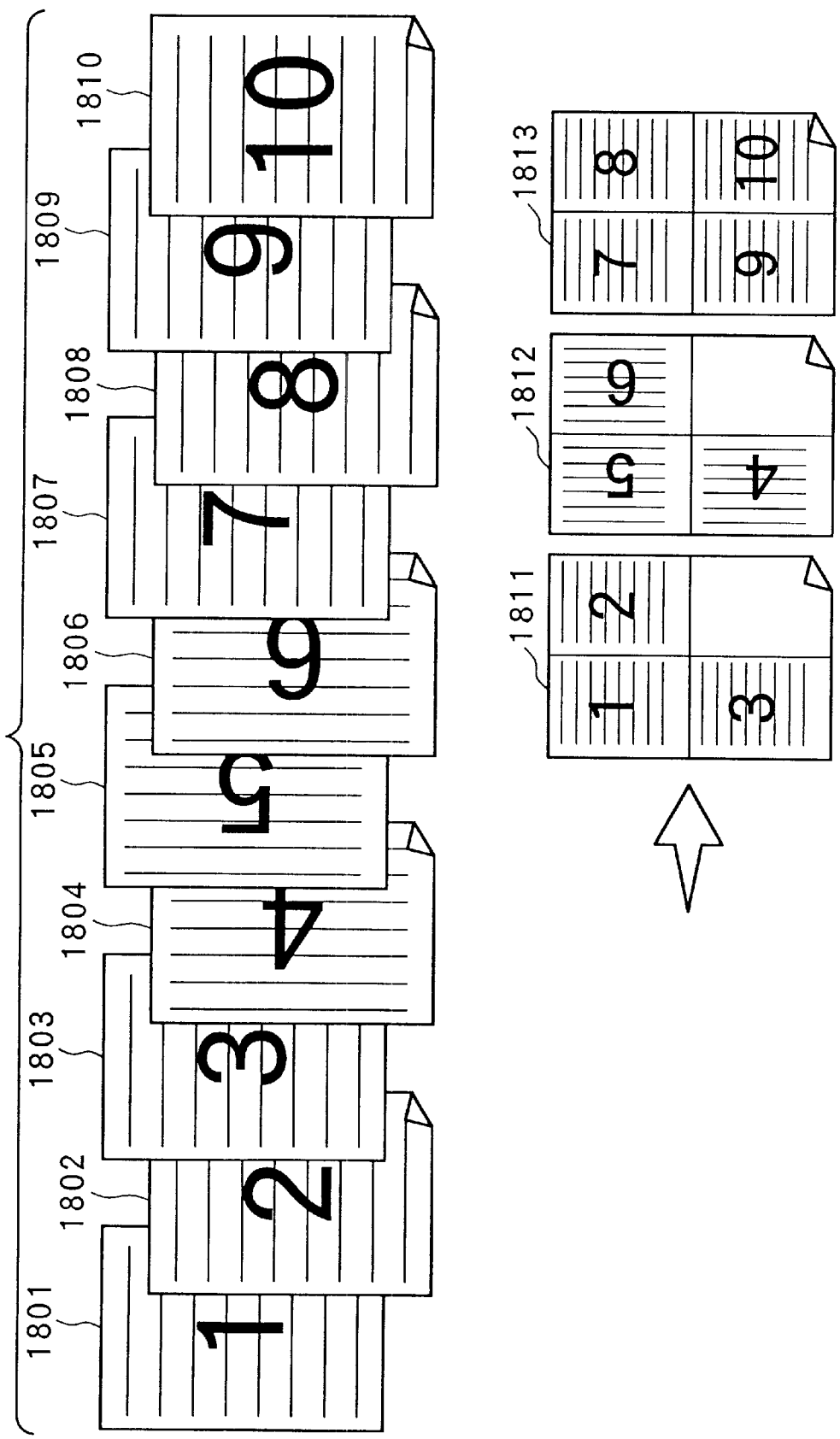
FIG. 27 shows the layout results of a plurality of originals formed in different formats.

FIG. 27 shows the layout results of a plurality of originals formed in different formats. More specifically, reference numerals 1801, 1802, 1803, 1807, 1808, 1809, and 1810 denote horizontally written portrait originals; and 1804, 1805, and 1806, horizontally written landscape originals. In this case, the originals 1801, 1802, and 1803 having the same format are laid out on one page to form a copy 1811. Also, the originals 1804, 1805, and 1806 having the same format are laid out on one page to form a copy 1812. Furthermore, the originals 1807, 1808, 1809, and 1810 are laid out on one page to form a copy 1813. In other words, among continuous originals, the page is updated at positions between the originals 1803 and 1804 having different formats, and between the originals 1806 and 1807 having different formats, thus determining layouts.

Figure 28:
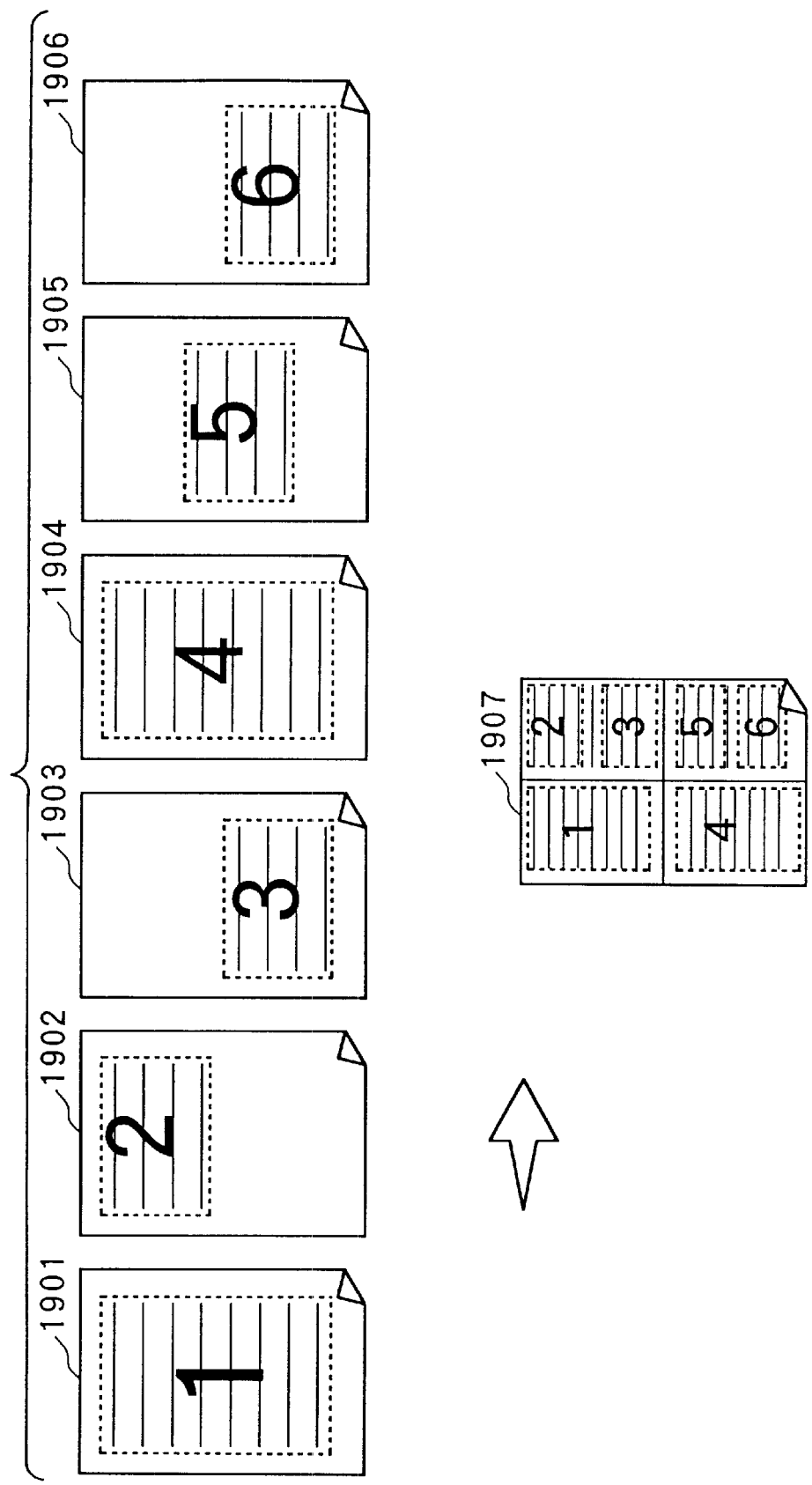
FIG. 28 shows a layout of originals with blank portions.

FIG. 28 shows the layout result of originals having blank portions. As shown in FIG. 28, originals 1902, 1903, 1905, and 1906 have blank portions, and in each of these originals, only half a page has data. At this time, by removing blank portions in the originals 1902, 1903, 1905, and 1906, these original images can be consequently laid out to form a copy 1907.

Figure 29:
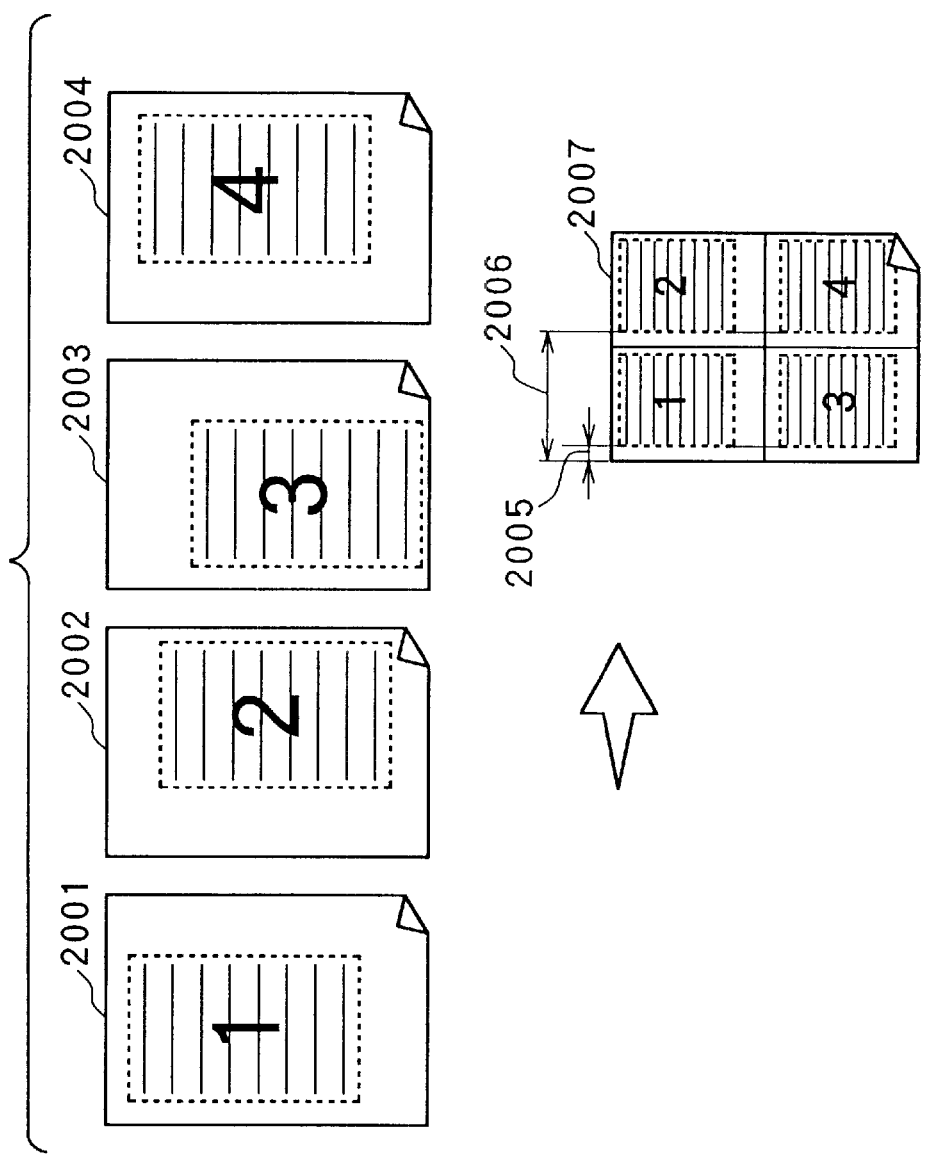
FIG. 29 shows a layout of originals with nonconsistent blank portions.

FIG. 29 shows the layout results of originals including nonuniform blank portions. As shown in FIG. 29, reference numerals 2001, 2002, 2003, and 2004 denote originals including nonuniform blank portions. By detecting the positions of blank portions, these original images can be laid out to form a copy 2007 having uniform blank portions 2005 and 2006.

[Original Direction Detection]

The original direction detector 106 in this embodiment will be described in detail below. The original direction detector 106 determines two directions, i.e., the direction (up, down, right, left) in which the original is placed, and the character writing direction (vertical writing, horizontal writing) on the original. As described above, when automatic determination of the original direction and character writing direction is designated at the control panel 400, control is done based on the two determination results of the detector 106.

Figure 30:
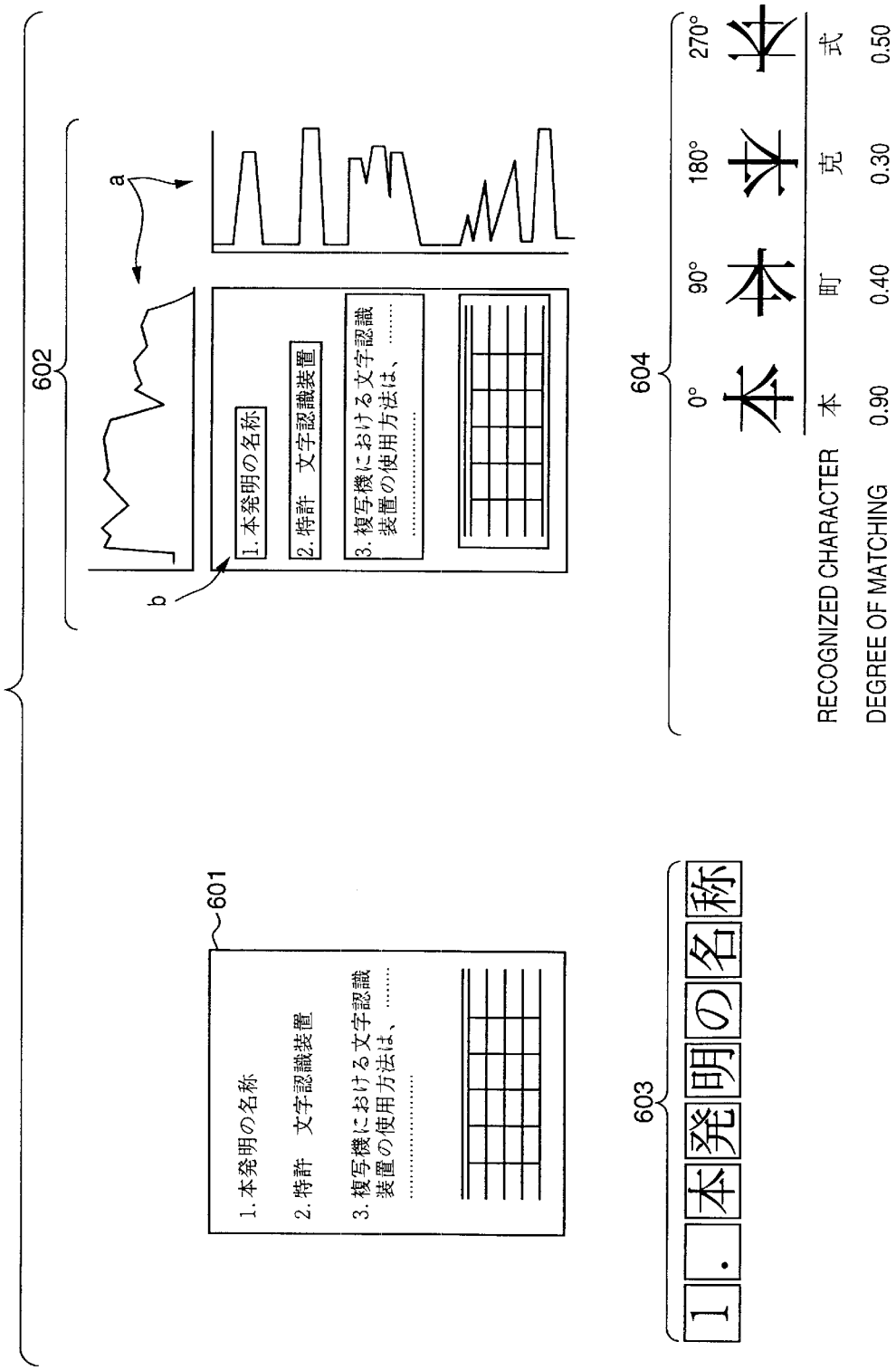
FIG. 30 is a view for explaining the outline of original direction detection.
Figure 31:
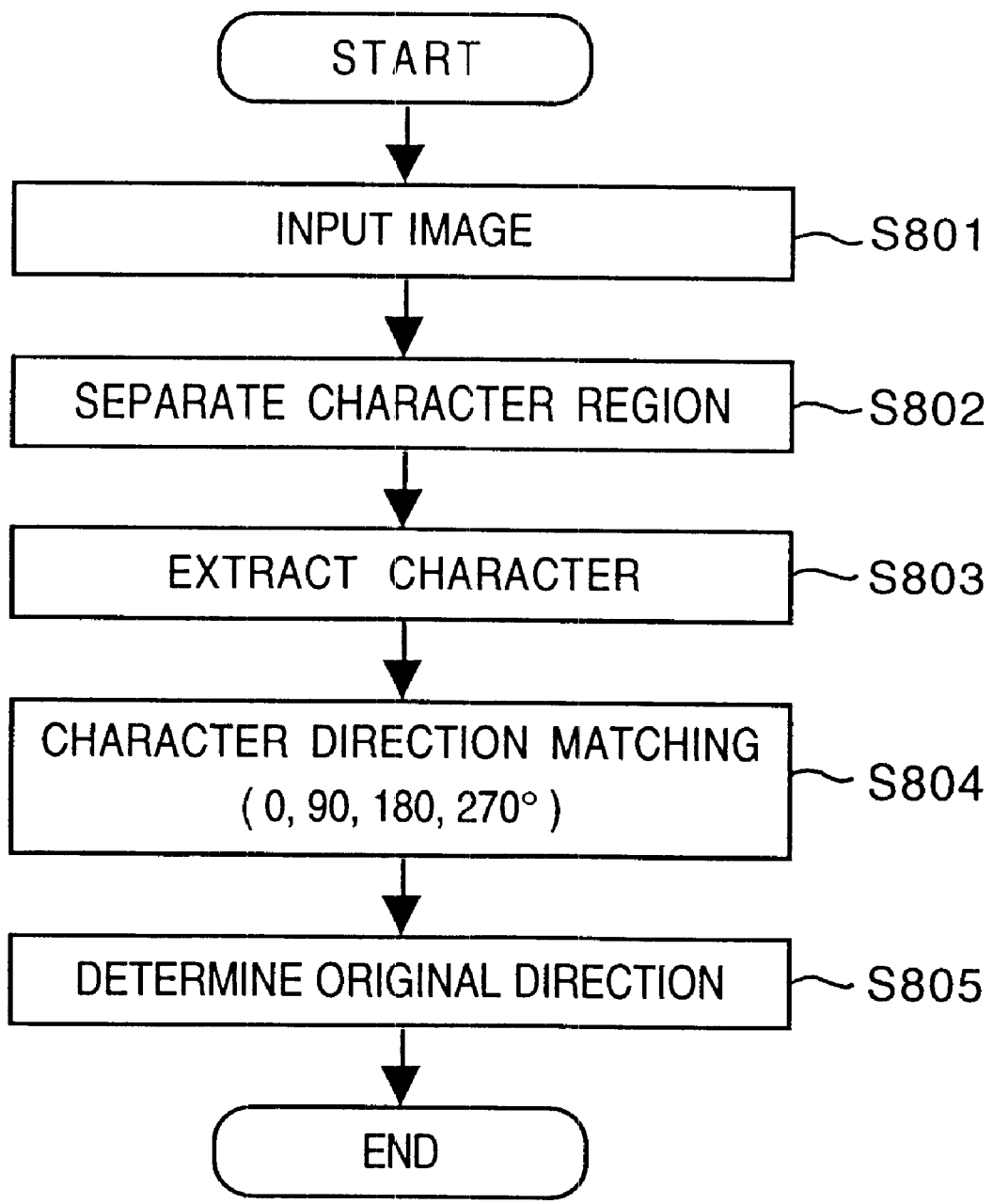
FIG. 31 is a flow chart showing the processing sequence of the original direction detection.

FIG. 30 is a view for explaining the outline of original direction detection. FIG. 31 is a flow chart showing the processing sequence of original direction detection. In step S801 in FIG. 31, the original direction detector 106 receives an image signal of an original. In FIG. 30, reference numeral 601 denotes an input original image. In step S802, a character region is separated to extract only a character portion in the read image. More specifically, vertically and horizontally accumulated histograms in the original image are calculated, and character regions are extracted from these accumulated histograms. In an original image 602 in FIG. 30, "a" indicates vertically and horizontally accumulated histograms in the original image, and "b" indicates extracted rectangular character regions. In step S803, characters are extracted from the extracted character region, as indicated by 603 in FIG. 30. In step S804, matching of character directions is done to recognize the pointing direction (up, down, right, left) of the character. More specifically, the degrees of matching with templates rotated at 90° increments are calculated to recognize the character directions, as indicated by 604 in FIG. 30. In the example indicated by 604 in FIG. 30, since the degree of matching at 0° is largest, it is recognized that the original of interest is of portrait type. In step S805, the original direction is finally determined based on the extracted character writing direction and the recognized character direction.

FIG. 32 shows the original directions and types. In FIG. 32, reference numeral 701 denotes a horizontally written portrait original; 702, a horizontally written landscape original; 703, a vertically written landscape original; and 704, a vertically written portrait original.

[Hard Disk and TAG Memory]

Figure 33:
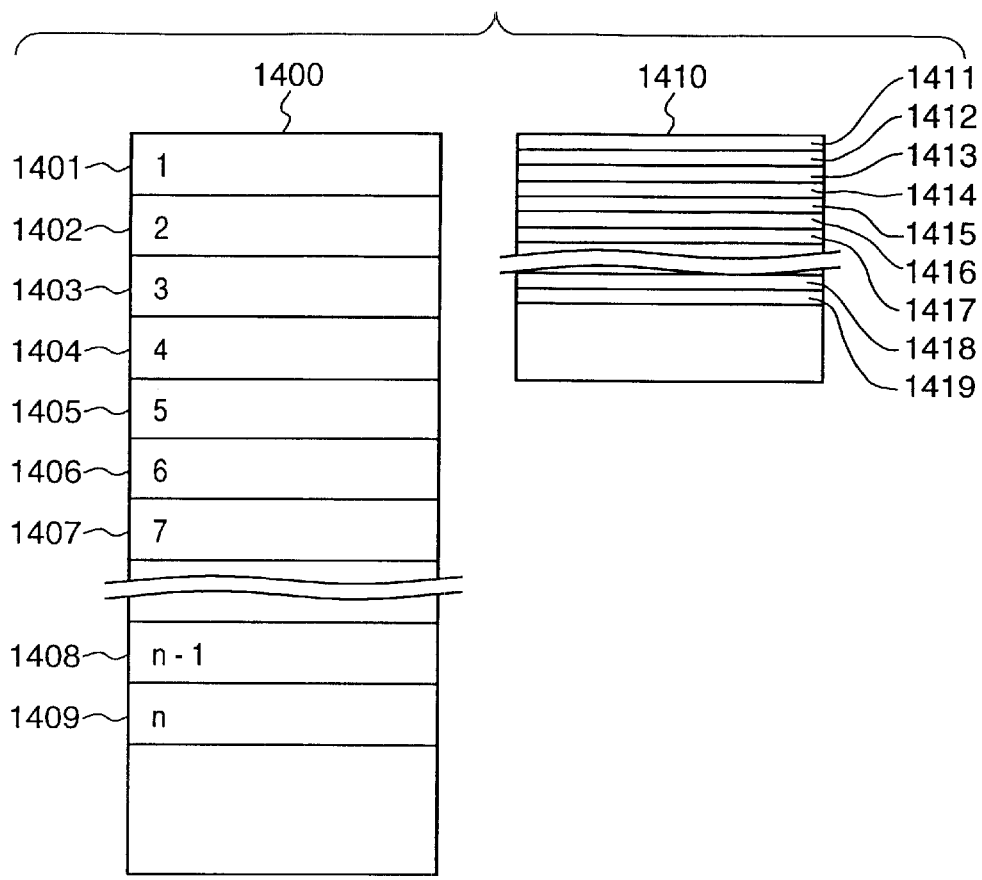
FIG. 33 shows the address maps of a hard disk 110 and a TAG memory 111.

The hard disk 110 and the TAG memory 111 will be explained below. FIG. 33 shows the address maps of the hard disk 110 and the TAG memory 111. In FIG. 33, reference numeral 1400 denotes an address map in the effective use area of the hard disk 110. Assume that the hard disk 110 stores image signals for n pages. More specifically, reference numerals 1401, 1402, 1403, 1404, 1405, 1406, 1407, 1408, and 1409 respectively denote image signals for the first, second, third, fourth, fifth, sixth, seventh, (n-1)-th, and n-th pages.

On the other hand, reference numeral 1410 denotes an address map in the effective use area in the TAG memory 111. The TAG memory 111 holds the directions of a plurality of originals set on the apparatus. More specifically, reference numerals 1411, 1412, 1413, 1414, 1415, 1416, 1417, 1418, and 1419 respectively denote the original directions of the first, second, third, fourth, fifth, sixth, seventh, (n-1)-th, and n-th pages.

Figure 34:
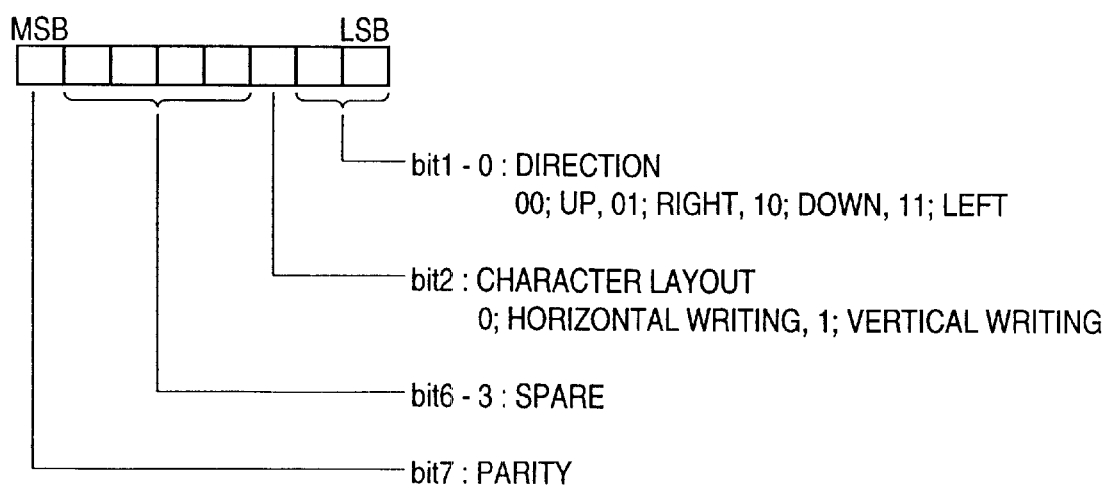
FIG. 34 shows the format of information held in the TAG memory 111.

Note that the image signals held in the hard disk 110 and the original directions held in the TAB memory 111 are stored in the same order to have one-to-one correspondence therebetween. Each original direction in the TAB memory 111 is 8-bit data, and is held, as shown in FIG. 34. More specifically, among 8 bits, bit 1 and bit 0 indicate the up, down, right, or left original direction (00 indicating up, 01; right, 10; down, and 11; left), and bit 2 indicates the layout (0: horizontal writing, 1: vertical writing) of characters on an original. Bits 6 to 3 are spare bits, and bit 7 as the MSB is a parity check bit.

As described above, in the hard disk 110 and TAG memory 111, the image signals and original directions have one-to-one correspondence therebetween. For this reason, the CPU need only access a small address space on the TAG memory 111 without accessing a large address space on the hard disk 110, so as to access the corresponding address on the hard disk 110, thus contributing to improvement of the productivity of the apparatus.

[Third Embodiment]

The third embodiment according to the present invention will be described below. In the third embodiment to be described below, the present invention is applied to a full-color copying machine.

Figure 35:
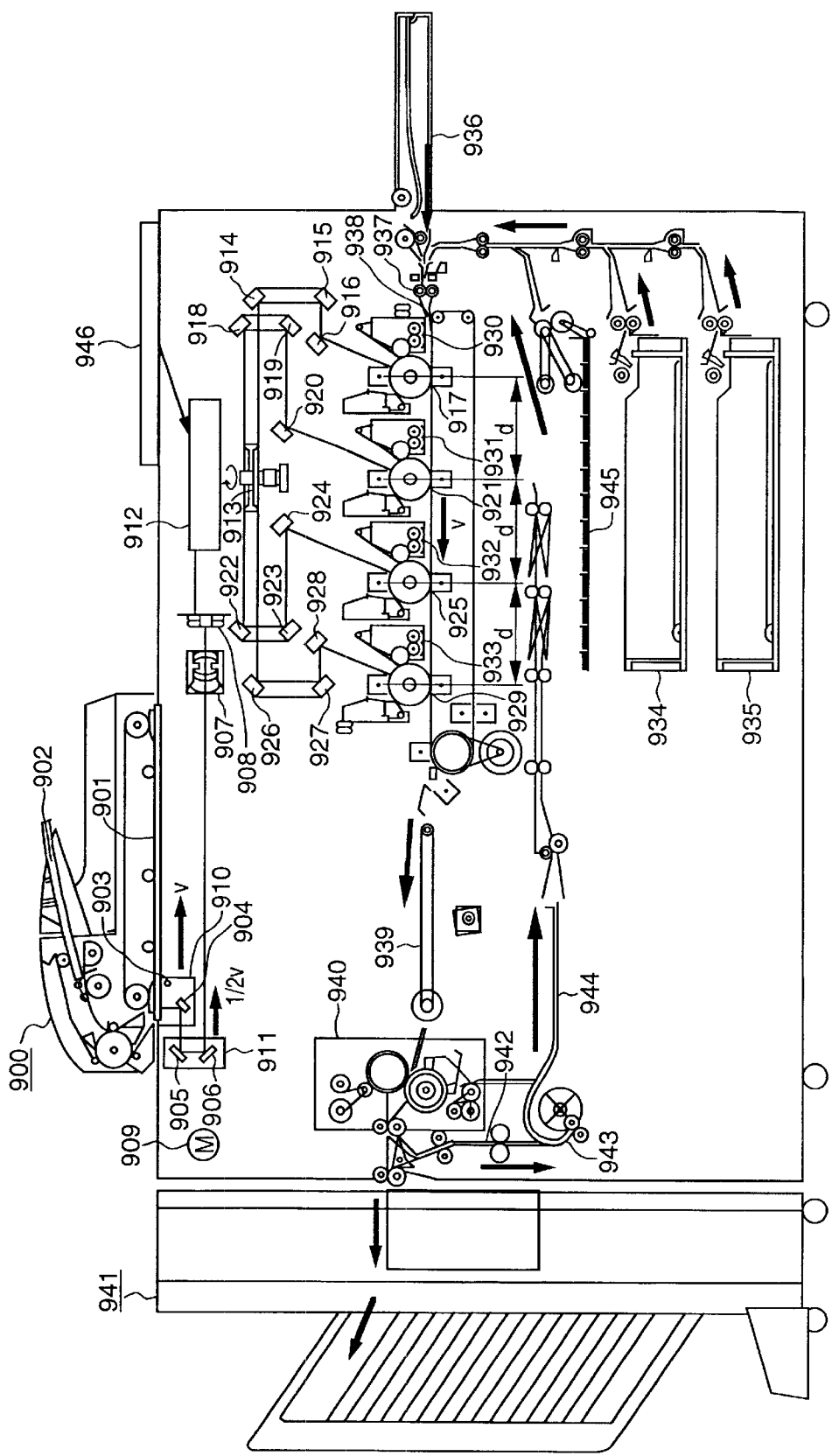
FIG. 35 is a sectional view showing the structure of a full-color copying machine according to the third embodiment of the present invention.

FIG. 35 is a sectional view showing the structure of a full-color copying machine. In FIG. 35, reference numeral 900 denotes an automatic document feeder (to be referred to as a DF hereinafter) which can automatically feed a plurality of originals one by one, and can sequentially set the front and back surfaces of each original on a platen 901. Since the detailed arrangement of the DF is already known to those who are skilled in the art, a detailed description thereof will be omitted. A plurality of originals 902 to be read are set on the DF 900. The originals 902 set on the DF 900 are fed one by one by the DF 900, and each original is placed on the platen 901. The original 902 on the platen 901 is illuminated by an illumination lamp 903, and light reflected by the original 902 forms an image on a CCD (or CCD sensor) 908 by an optical system 907 via mirrors 904, 905, and 906. Furthermore, a first mirror unit 910 including the mirror 904 and the illumination lamp 903 is mechanically driven by a motor 909 at a velocity V. On the other hand, a second mirror unit 911 including the mirrors 905 and 906 is driven at a velocity ½V to scan the entire surface of the original 902.

Reference numeral 912 denotes an image processing circuit unit for processing read image information as an electrical signal, temporarily holding the electrical signal on an image memory, and outputting the held signal as a print signal. The print signal output from the image processor 912 is supplied to a laser driver (not shown) to drive four semiconductor lasers (not shown). Reference numeral 913 denotes a polygonal mirror, which receives four laser beams emitted by the four semiconductor lasers (not shown). Among the four laser beams, one laser beam scans a photosensitive drum 917 via mirrors 914, 915, and 916. The next laser beam scans a photosensitive drum 921 via mirrors 918, 919, and 920. The next laser beam scans a photosensitive drum 925 via mirrors 922, 923, and 924. The last laser beam scans a photosensitive drum 929 via mirrors 926, 927, and 928.

Reference numeral 930 denotes a developer for supplying yellow (Y) toner. The developer 930 forms a yellow toner image on the photosensitive drum 917 in accordance with the laser beam. Reference numeral 931 denotes a developer for supplying magenta (M) toner. the developer 931 forms a magenta toner image on the photosensitive drum 921 in accordance with the laser beam. Reference numeral 932 denotes a developer for supplying cyan (C) toner. The developer 932 forms a cyan toner image on the photosensitive drum 925 in accordance with the laser beam. Reference numeral 933 denotes a developer for supplying black (Bk) toner. The developer 933 forms a black toner image on the photosensitive drum 929 in accordance with the laser beam.

The above-mentioned four-color (Y, M, C, Bk) toner images are transferred onto a paper sheet to obtain a full-color output image.

A paper sheet supplied from one of paper cassettes 934 and 935 and a manual insertion tray 936 is chucked on and conveyed by a transfer belt 928 via registration rollers 927. The individual color toner images are formed on the photosensitive drums 917, 921, 925, and 929 in advance in synchronism with the paper feed timings, and are transferred onto the paper sheet as the paper sheet is conveyed.

The paper sheet on which the color toner images have been transferred is peeled, and is conveyed by a conveyor belt 939. The toner images are fixed on the paper sheet by a fixing device 940, and the paper sheet is exhausted onto a sorter/stapler 941 in a single-sided copying mode, or is exhausted onto a two-sided path 942 in a two-sided copying mode.

In the two-sided copying mode, the paper sheet exhausted from the fixing device 940 onto the two-sided path 942 is reversed by a reversing path 943, and is held on a two-sided tray 945 via a convey portion 944. The paper sheet held on the two-sided tray 945 is fed again, and is chucked on and conveyed by the transfer belt 938 via the registration rollers 937 so as to form images on the back surface. As in the front surface, the individual color toner images are formed on the photosensitive drums 917, 921, 925, and 929 in advance in synchronism with the paper feed timings, and are transferred onto the paper sheet as the paper sheet is conveyed. Thereafter, the paper sheet is peeled and is conveyed by the conveyor belt 939. Finally, the toner images are fixed on the paper sheet by the fixing device 940, and the paper sheet is exhausted onto the sorter/stapler 941 as in the single-sided copying mode.

The sorter/stapler 941 can sort and staple exhausted copies. Since the detailed arrangement of the sorter/stapler 941 is known to those who are skilled in the art, a description thereof will be omitted. Reference numeral 946 denotes a control panel, which is equivalent to that described in the above embodiment.

[Flow of Image Processing]

Figure 36:
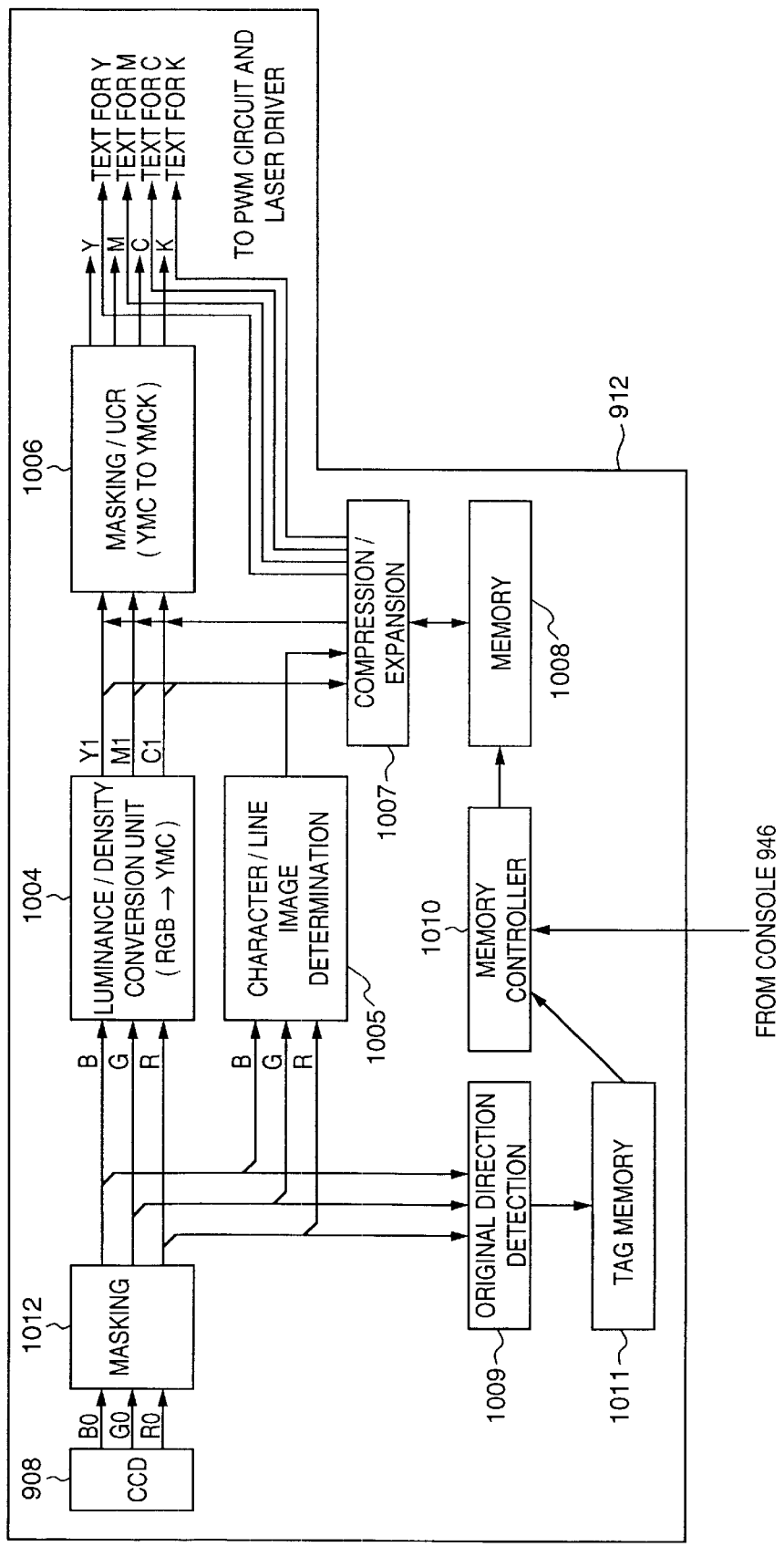
FIG. 36 is a block diagram for explaining the flow of an image signal in the third embodiment.

FIG. 36 is a block diagram for explaining the flow of an image signal. In FIG. 36, reference numeral 908 denotes a CCD which outputs a read image as digital images in units of three color components, i.e., red (R), green (G), and blue (B). Reference numeral 1012 denotes a masking circuit which converts input (R0, G0, B0) signals into standard (R, G, B) signals by calculating:

$$\begin{bmatrix} R \\ G \\ B \end{bmatrix} = \begin{bmatrix} c11 & c12 & c13 \\ c21 & c22 & c23 \\ c31 & c32 & c33 \end{bmatrix} \begin{bmatrix} R0 \\ G0 \\ B0 \end{bmatrix} \quad (1)$$

where Cij (i=1, 2, 3, j=1, 2, 3) is a constant inherent to the apparatus in consideration of various characteristics such as the sensitivity characteristics of the CCD sensor, the spectrum characteristics of the illumination lamp, and the like.

Reference numeral 1004 denotes a luminance/density conversion unit which comprises a RAM or ROM look-up table, and calculates:

$$C1 = -K \times log\ 10(R/255)$$

$$M1 = -K \times log\ 10(G/255)$$

$$Y1 = -K \times log\ 10(B/255) \quad (2)$$

Reference numeral 1006 denotes an output masking/UCR circuit which converts C1, M1, and Y1 signals into C, M, Y, and Bk signals as toner colors of the full-color copying apparatus by calculating:

$$\begin{bmatrix} C \\ M \\ Y \\ Bk \end{bmatrix} = \begin{bmatrix} a11 & a21 & a31 & a41 \\ a12 & a22 & a23 & a24 \\ a13 & a23 & a33 & a34 \\ a14 & a24 & a34 & a44 \end{bmatrix} \begin{bmatrix} C1 \\ M1 \\ Y1 \\ Bk1 \end{bmatrix} \quad (3)$$

where aij (i=1, 2, 3, 4, j=1, 2, 3, 4) is a constant in consideration of various color tone characteristics of toners, and also, Bk1 is given by:

$$Bk1 = min(C1, M1, Y1) \quad (4)$$

Equations (2), (3), and (4) above correct C1, M1, Y1, and Bk1 signals based on the R, G, and B signals read by the CCD sensor into C, M, Y, and Bk signals on the basis of the spectral distribution characteristics of toners, and the corrected signals are output.

Reference numeral 1005 denotes a character/line image detection circuit which determines if each pixel in an original image is a portion of a character or line image, and output a determination signal TEXT on the basis of the determination result. Reference numeral 1007 denotes a compression/expansion circuit which compresses image signals (R, G, and B) and the character/line image determination signal TEXT to reduce their information volumes, and then stores the compressed signals on a memory 1008. At the same time, the compression/expansion circuit 1007 expands data read out from the memory 1008 into image signals (R, G, and B) and the character/line image determination signal TEXT. Note that a detailed description of the compression/expansion circuit 1007 will be omitted since it can be implemented using a known compression/expansion circuit.

Image signals read by the CCD 908 are compressed by the image compression/expansion circuit 1007 via the masking circuit 1112 and the luminance/density conversion unit 1004, and the compressed image signals are written in the memory 1008. Also, the character/line image determination signal TEXT determined by the character/line image determination circuit 1005 is compressed by the image compression/expansion circuit 1007, and the compressed signal is written in the memory 1009. In this manner, the memory 1008 stores a series of image signals for a plurality of pages.

Reference numeral 1009 denotes an original direction detection unit which is equivalent to the original direction detector 106 described above, and detects the direction of the read original. That is, the detection unit 1009 determines if the original is placed with its top side pointing up or down, or to the right or left and if the original is a vertically or horizontally written one, and writes the determination result in a TAG memory 1011 equivalent to the TAG memory 111 described above. As in the above embodiment, image signals held in the memory 1008 and detected information held in the TAG memory 1011 have one-to-one correspondence therebetween in units of pages.

Reference numeral 1010 denotes a memory controller, which reads out the detection result of the original direction detection unit 1009 from the TAG memory 1011. Alternatively, the memory controller 1010 controls the image layout when image signals are written in the memory 1008 on the basis of the original direction and character writing direction designated at the control panel 956. That is, the memory controller 1010 executes write position control and transposition control by controlling the initial value and UP/DOWN of an address counter upon writing an image signal.

Furthermore, image signals read out from the memory 1008 are expanded by the image compression/expansion circuit 1007, and the expanded signals are sent to the laser driver via a PWM circuit (not shown) in accordance with the image formation timing of the copying machine.

Figure 37:
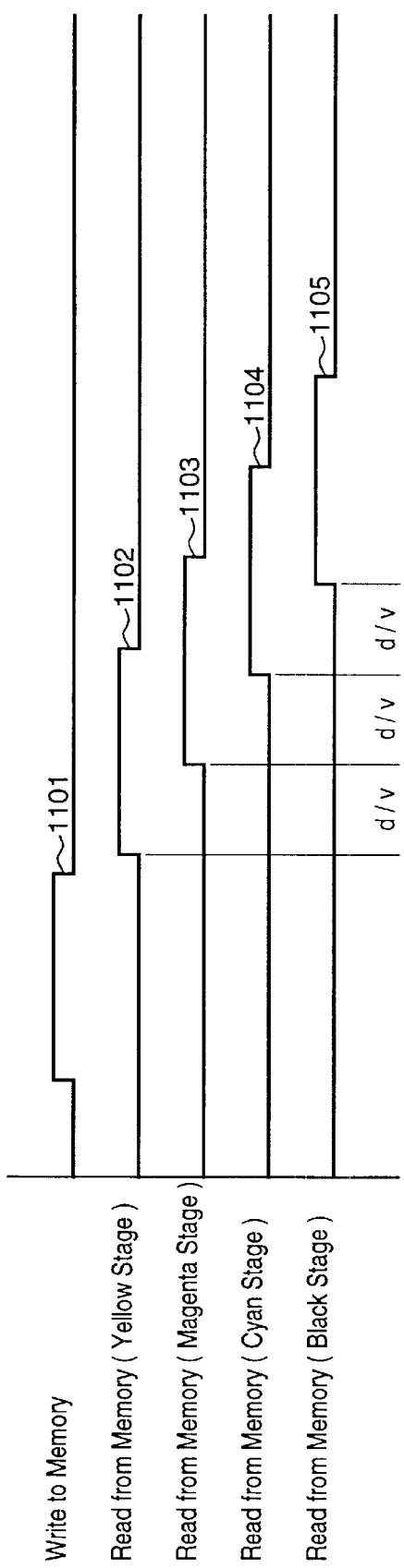
FIG. 37 is a timing chart showing the read/write timings to a memory 1008.

FIG. 37 is a timing chart showing the read/write timings with respect to the memory 1008. In FIG. 37, image data read by the CCD 908 are written in the memory 1008 at a timing 1101. The image data written on the memory 1108 are read out at timings 1102, 1103, 1104, and 1105. The timings 1102, 1103, 1104, and 1105 are defined, so that the individual image signals are read out at time intervals d/v. Note that d is the interval between adjacent ones of the four drums arranged at equal intervals, and v is the velocity of a paper sheet conveyed by the conveyor belt.

[Original Direction Detection]

Figure 38:
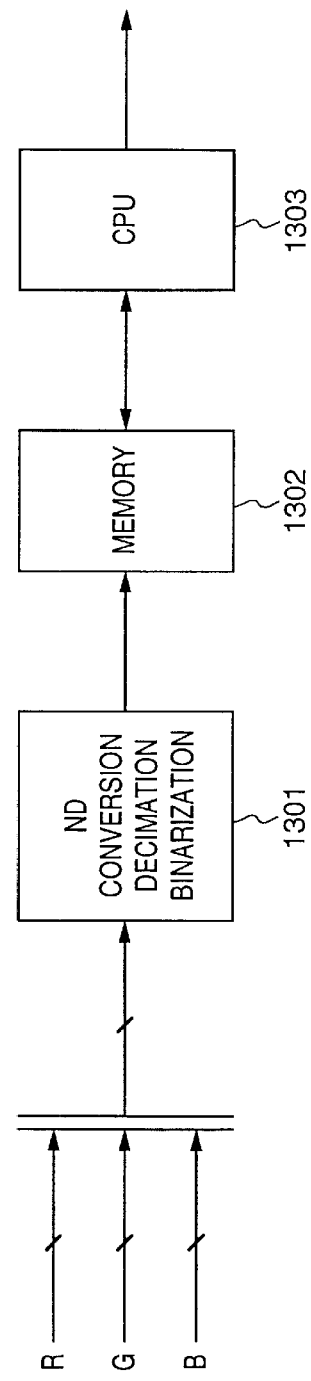
FIG. 38 is a block diagram showing the arrangement of an original direction detector 1009 shown in FIG. 36.

FIG. 38 is a block diagram showing the arrangement of the original direction detection unit 1009. As shown in FIG. 38, R, G, and B signals as image signals based on the read original are subjected to ND conversion (monochrome conversion), decimation, and binarization by a decimation circuit 1301 to sufficiently reduce their information volumes, and thereafter, the processed signals are held in a memory 1302. A CPU 1303 accesses the image information held in the memory 1302 to determine the original direction and vertical writing/horizontal writing. Since the practical determination method can use a state-of-the-art technique, a description thereof will not be made herein. The determination result is expressed by, e.g., a total of 3 bits, i.e., a 2-bit code representing the original direction (up, down, right, left), and a 1-bit code representing if the original is a vertically or horizontally written one.

Furthermore, since some originals cannot be detected and detection errors cannot be perfectly avoided, the directions of all originals fed by the DF are detected in this embodiment. Among the detection results, the direction in the majority is determined as a detection result, thus improving the detection precision.

As described above, according to the third embodiment, the original direction and character writing direction (vertical or horizontal writing) of an original are determined in a full-color copying machine, and layout is determined in accordance with the determination result, thus realizing a desired reduced-scale layout as in the above-mentioned embodiments.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention. As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 39:
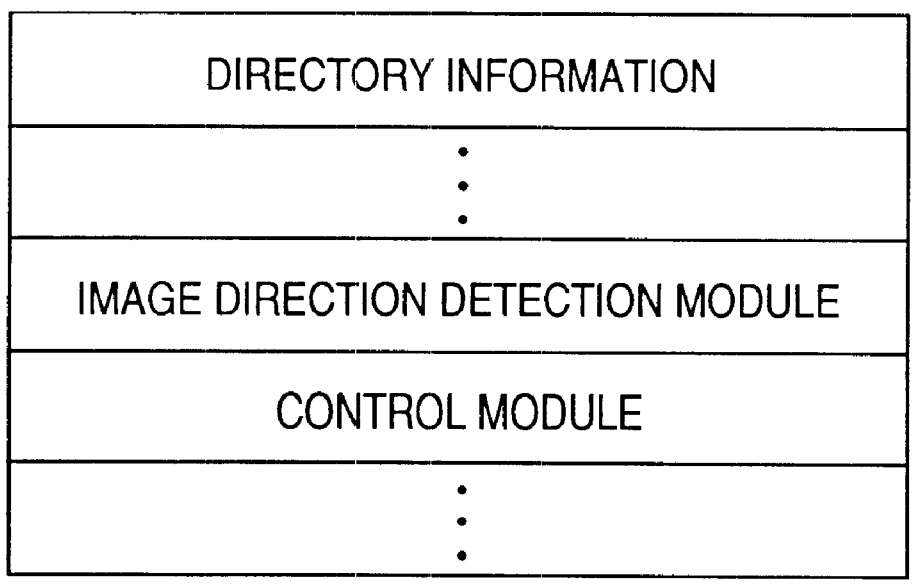
FIG. 39 shows the memory map of modules stored in a storage medium.

When the present invention is applied to the storage medium, the storage medium stores program codes corresponding to the flow charts described above. Simply stated, the storage medium stores modules shown in an example of the memory map shown in FIG. 39.

More specifically, the storage medium need only store program codes of an "image direction detection module" and "control module".

As described above, according to the present invention, since predetermined image forming processing is set for the direction determination result of an original image, an image that the operator intended can be formed. Also, since the layout of output images is determined in accordance with the determination results of the direction and type of read original, image formation that the operator intended can be made.

The preferred embodiments of the present invention have been described. However, the present invention is not limited to the above-mentioned specific embodiments, and various changes and modifications may be made within the scope of the appended claims.

What is claimed is:

1. An image process control apparatus comprising:

detection means for detecting an image direction of an original image;

control means for controlling image processing in accordance with the detection result of said detection means, based on a probability level indicating a degree of confidence in the detection result; and prompt means for prompting a destination of the image direction of the original image when the probability level is less than a reference level.

2. The apparatus according to claim 1, wherein said control means controls a predetermined image processing, based on a condition that the probability level is more than a reference level.

3. The apparatus according to claim 2, wherein said control means interrupts the predetermined image processing, based on a condition that the probability level is less than a reference level.

4. The apparatus according to claim 2, further comprising setting means for setting the reference level.

5. The apparatus according to claim 1, wherein said control means interrupts image forming, based on a condition that the probability level is less than a reference level.

6. The apparatus according to claim 1, wherein the image processing is image rotation processing.

7. An image process control apparatus comprising:

detection means for detecting an image direction of an original image; and control means for controlling image processing in accordance with the detection result of said detection means, based on a probability level indicating a degree of confidence in the detection result, wherein said control means controls image processing in accordance with the detection result of said detection means of a previous image, when the probability level is less than a reference level.

8. An image process control method comprising:

a detection step, of detecting an image direction of an original image;

a control step, of controlling image processing in accordance with the detection result of said detection step, based on a probability level indicating a degree of confidence in the detection result; and a prompt step, of prompting a destination of the image direction of the original image when the probability level is less than a reference level.

9. The method according to claim 8, wherein said control step controls a predetermined image processing, based on a condition that the probability level is more than a reference level.

10. The method according to claim 9, wherein said control step interrupts the predetermined image processing, based on a condition that the probability level is less than a reference level.

11. The method according to claim 9, further comprising a setting step of setting the reference level.

12. The method according to claim 8, wherein said control step interrupts image forming, based on a condition that the probability level is less than a reference level.

13. The method according to claim 8, wherein the image processing is image rotation processing.

14. An image process control method comprising:
- a detection step, of detecting an image direction of an original image; and
- a control step, of controlling image processing in accordance with the detection result of said detection step, based on a probability level indicating a degree of confidence in the detection result,
- wherein said control step controls image processing in accordance with the detection result of said detection step of a previous image, when the probability level is less than a reference level.

15. The method according to claim 14, wherein said control step controls a predetermined image processing, based on a condition that the probability level is more than a reference level.

16. The method according to claim 14, wherein said control step interrupts the predetermined image processing, based on a condition that the probability level is less than a reference level.

17. The method according to claim 14, further comprising setting step of setting the reference level.

18. The method according to claim 14, wherein said control step interrupts image forming, based on a condition that the probability level is less than a reference level.

19. The method according to claim 14, wherein the image processing is image rotation.

20. A computer-readable medium storing a computer readable program for implementing a computer implementation method of image processing, comprising:
- a detection step, of detecting an image direction of an original image;
- a control step, of controlling image processing in accordance with the detection result of said detection step, based on a probability level indicating a degree of confidence in the detection result; and
- a prompt step, of prompting a destination of the image direction of the original image when the probability level is less than a reference level.

21. The medium according to claim 20, wherein said control step controls a predetermined image processing, based on a condition that the probability level is more than a reference level.

22. The medium according to claim 21, wherein said control step interrupts the predetermined image processing, based on a condition that the probability level is less than a reference level.

23. The medium according to claim 21, further comprising a setting step of setting the reference level.

24. The medium according to claim 20, wherein said control step interrupts image forming, based on a condition that the probability level is less than a reference level.

25. The medium according to claim 20, wherein the image processing is image rotation processing.

26. A computer-readable medium storing a computer readable program for implementing a computer implementation method of image processing, comprising:
- a detection step, of detecting an image direction of an original image; and
- a control step, of controlling image processing in accordance with the detection result of said detection step, based on a probability level indicating a degree of confidence in the detection result,
  - wherein said control step controls image processing in accordance with the detection result of said detection step of a previous image, when the probability level is less than a reference level.

27. An image direction detecting apparatus comprising:
- first detection means for detecting an image direction of an original image, wherein said first detection means detects the image direction of the original image by using a plurality of characters included in the original image;
- second detection means for detecting a probability level indicating a degree of confidence in the detection result of said first detection means; and
- recognition means for performing a character recognition processing for characters included in the original image with respect to plural directions, wherein said first detection means detects the image direction of the original image based on the recognition result by said recognition means.

28. An image direction detecting method comprising:
- a first detection step, of detecting an image direction of an original image, wherein said first detection step detects the image direction of the original image by using a plurality of characters included in the original image;
- a second detection step, of detecting a probability level indicating a degree of confidence in the detection result of said first detection step; and
- a recognition step, of performing a character recognition processing for characters included in the original image with respect to plural directions, wherein said first detection step detects the image direction of the original image based on the recognition result by said recognition step.

29. A computer readable medium having recorded thereon codes for implementing a computer implementable method of image direction detecting comprising:
- a first detection step, of detecting an image direction of an original image, wherein said first detection step detects the image direction of the original image by using a plurality of characters included in the original image;
- a second detection step, of detecting a probability level indicating a degree of confidence in the detection result of said first detection step; and
- a recognition step, of performing a character recognition processing for characters included in the original image with respect to plural directions, wherein said first detection step detects the image direction of the original image based on the recognition result by said recognition step.

* * * * *

UNITED STATES PATENT AND TRADEMARK OFFICE
CERTIFICATE OF CORRECTION

PATENT NO. : 6,411,743 B1
DATED : June 25, 2002
INVENTOR(S) : Shokyo Koh et al.

It is certified that error appears in the above-identified patent and that said Letters Patent is hereby corrected as shown below:

Title page,
Item [73], Assignee, "Canon Kabushiki Kaisha, Tokyo (JO)" should read
-- Canon Kabushiki Kaisha, Tokyo (JP) --.

Column 1,
Line 4, "U.S." should read -- now U.S. --.

Column 2,
Line 5, "Scanner," should read -- scanner, --.

Column 7,
Line 11, "474. are" should read -- 474 are --;
Line 65, "of" should be deleted.

Column 10,
Line 55, "character "廾"" should read -- character --;
Line.56, "is" (second occurrence) should read -- "田J" is --.

Column 11,
Line 36, "Written" should read -- written --.

Column 12,
Line 44, "processing-in" should read -- processing in --.

Column 14,
Line 54, "Sorter" should read -- sorter --.

Column 17,
Line 56, "Compress" should read -- compress --.

Column 20,
Line 4, "on" should read -- one --.

UNITED STATES PATENT AND TRADEMARK OFFICE
CERTIFICATE OF CORRECTION

PATENT NO.    : 6,411,743 B1
DATED         : June 25, 2002
INVENTOR(S)   : Shokyo Koh et al.

It is certified that error appears in the above-identified patent and that said Letters Patent is hereby corrected as shown below:

<u>Column 22,</u>
Line 35, "the" should read -- The --.

Signed and Sealed this

Eleventh Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,411,743 B1
DATED         : June 25, 2002
INVENTOR(S)   : Shokyo Koh et al.

It is certified that error appears in the above-identified patent and that said Letters Patent is hereby corrected as shown below:

<u>Title page,</u>
Item [73], Assignee, "Canon Kabushiki Kaisha, Tokyo (JO)" should read
-- Canon Kabushiki Kaisha, Tokyo (JP) --.

<u>Column 1,</u>
Line 4, "U.S." should read -- now U.S. --.

<u>Column 2,</u>
Line 5, "Scanner," should read -- scanner, --.

<u>Column 7,</u>
Line 11, "474. are" should read -- 474 are --;
Line 65, "of" should be deleted.

<u>Column 10,</u>
Line 55, "character "田J"" should read -- character --;
Line 56, "is" (second occurrence) should read -- "田J" is --.

<u>Column 11,</u>
Line 36, "Written" should read -- written --.

<u>Column 12,</u>
Line 44, "processing-in" should read -- processing in --.

<u>Column 14,</u>
Line 54, "Sorter" should read -- sorter --.

<u>Column 17,</u>
Line 56, "Compress" should read -- compress --.

<u>Column 20,</u>
Line 4, "on" should read -- one --.

<u>Column 22,</u>
Line 35, "the" should read -- The --.

UNITED STATES PATENT AND TRADEMARK OFFICE
CERTIFICATE OF CORRECTION

PATENT NO. : 6,411,743 B1
DATED : June 25, 2002
INVENTOR(S) : Shokyo Koh et al.

It is certified that error appears in the above-identified patent and that said Letters Patent is hereby corrected as shown below:

<u>Column 24,</u>
Line 2, "output" should read -- outputs --; and
Line 22, "memory 1009." should read -- memory 1008. --.

This certificate supersedes Certificate of Correction issued March 11, 2003.

Signed and Sealed this

Eleventh Day of November, 2003

JAMES E. ROGAN
*Director of the United States Patent and Trademark Office*